United States Patent

Ohsaki et al.

[11] Patent Number: 4,594,227
[45] Date of Patent: Jun. 10, 1986

[54] REACTION METHOD AND REACTOR THEREFOR

[75] Inventors: Kozo Ohsaki, Funabashi; Jun Zanma, Yachiyo; Hiroshi Watanabe, Zushi, all of Japan

[73] Assignee: Toyo Engineering Corporation, Tokyo, Japan

[21] Appl. No.: 530,298

[22] Filed: Sep. 8, 1983

[30] Foreign Application Priority Data

Sep. 28, 1982 [JP] Japan ................. 57-167639

[51] Int. Cl.[4] ........................... B01J 8/02; F28D 7/00
[52] U.S. Cl. ................................... 422/148; 422/190; 422/192; 422/195; 422/201; 422/216; 422/218; 422/220; 423/359
[58] Field of Search ............... 422/129, 190, 192, 195, 422/201, 205, 216, 220, 218, 148; 423/359

[56] References Cited

U.S. PATENT DOCUMENTS

| | | | |
|---|---|---|---|
| 2,715,570 | 8/1955 | King | 422/218 X |
| 2,835,560 | 5/1958 | Bason et al. | 422/218 X |
| 3,249,405 | 5/1966 | Waddill | 422/220 X |
| 3,754,078 | 8/1973 | Hinrichs et al. | 423/359 |
| 3,898,049 | 8/1975 | Burroughs et al. | 422/190 |
| 4,321,234 | 3/1982 | Ohsaki et al. | 422/200 |
| 4,346,060 | 8/1982 | Eagle et al. | 422/148 |
| 4,421,723 | 12/1983 | Farnham | 422/218 |

*Primary Examiner*—David L. Lacey
*Assistant Examiner*—William R. Johnson
*Attorney, Agent, or Firm*—Flynn, Thiel, Boutell & Tanis

[57] ABSTRACT

An apparatus for carrying out a catalytic chemical reaction in the presence of a granular catalyst under conditions such that both the reactants and the reaction product are gaseous at the temperature and pressure of the reaction. According to the present invention, a vertically extending, annular, intercylinder space, defined between a cylindrical outer catalyst retainer and a cylinder inner catalyst retainer, is divided by radially extending vertical partition walls into a plurality of chambers. Heat-exchanging tubes are disposed vertically in at least one of the chambers. A granular catalyst is packed in at least two of said chambers to form at least two reaction chambers. A feed gas is caused to flow successively and in radial directions through these reaction chambers. Since the invention reactor achieves an improved linear gas flow velocity and a greater overall heat-transfer coefficient, the reactor of the invention requires fewer heat-exchanging tubes and can thus be made smaller. The optimum temperature distribution for the reaction can be attained in each reaction chamber.

21 Claims, 18 Drawing Figures

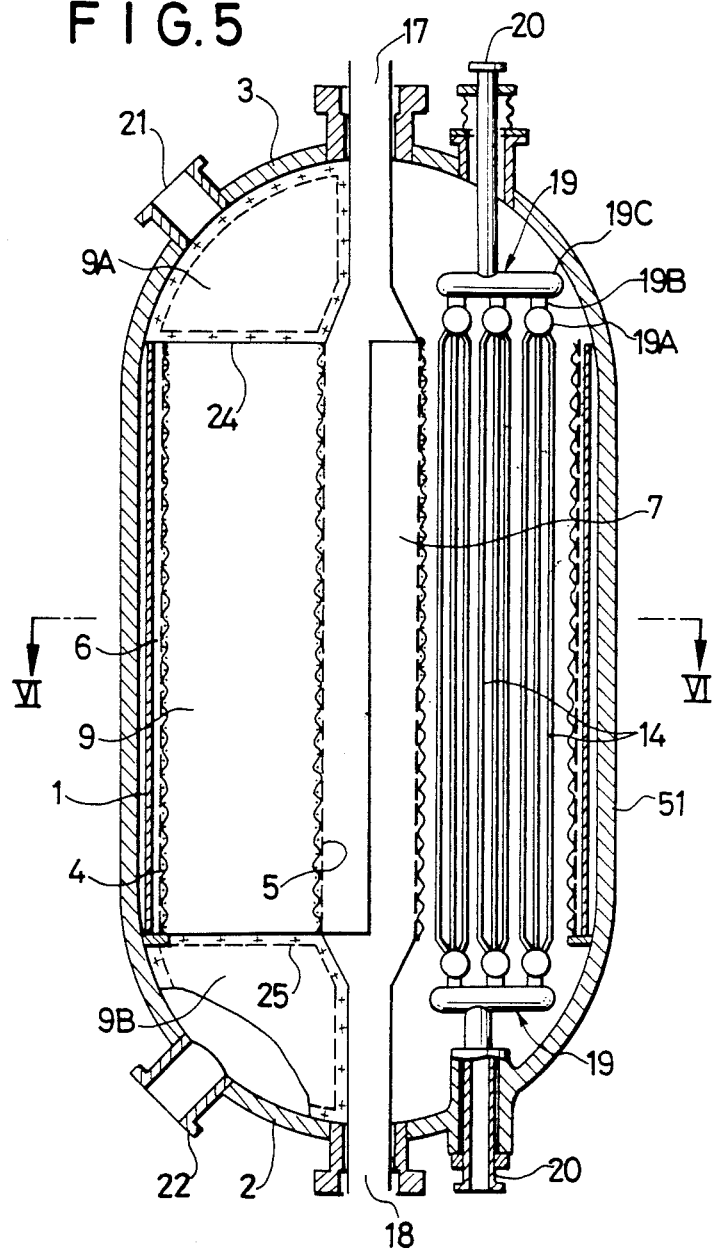

FIG. 13

REACTION METHOD AND REACTOR THEREFOR

BACKGROUND OF THE INVENTION

1. Field of the Invention

This invention relates to an improvement in or relating to a reactor adapted to carry out a chemical reaction, in the presence of a granular catalyst, under conditions such that both the reactants and the reaction product are gaseous throughout the reaction, and to a reaction method using such a reactor. More specifically, the present invention relates to an improvement in a reactor of the type wherein a gas is caused to flow in radial directions through a catalyst bed packed in an annular, intercylinder space defined by two cylinders having different diameters.

2. Description of the Prior Art

Reactors of the type wherein a gas is caused to flow in radial directions through an intercylinder catalyst bed, which bed is formed by packing a granular catalyst in an annular intercylinder space defined by two cylinders having different diameters, have been described in a number of publications. These prior proposals, however, do not deal to a sufficient extent with the problem of the temperature distribution in the catalyst bed in the direction of the flow of the gas. Thus, they have not succeeded in achieving a reduction of the size of a reactor of the above type, without also causing a lowering of its performance.

An improved reactor of the foregoing type and a method of using same are disclosed in Japanese Patent Laid-Open No. 149640/1980 and U.S. Pat. No. 4,321,234. The foregoing patents are directed to a method for controlling the temperatures at various points along the gas flow path in an intercylinder catalyst bed, namely, a catalyst bed interposed between two gas-permeable cylindrical catalyst retainers having different diameters. Desired temperatures are achieved by arranging a number of vertically extending cooling tubes on a group of circles, which circles are concentric with the common central axis of the two catalyst retainers, and causing a feed gas to flow in radial directions through the intercylinder catalyst bed so that the feed gas undergoes a catalytic reaction to produce a product gas, while causing a cooling fluid to pass through the cooling tubes to transfer the resultant exothermic reaction heat to the cooling fluid.

SUMMARY OF THE INVENTION

The present inventors have carried out extensive experimental investigations of the above-described method and reactor. It has been found that the above-described method and reactor can be further improved by the present invention.

The present invention relates to an improvement in the above-described reaction method, which improvement enables the reactor to be made smaller without lowering its performance. This invention also relates to an improved reactor useful for practicing the improved reaction method.

The fundamental aspects of the present invention reside in the following features: (1) a space similar to the intercylinder catalyst bed of U.S. Pat. No. 4,321,234 is divided into a plurality of chambers by means of radially extending, vertical, partition walls, (2) heat-exchanging tubes are arranged in at least two of these chambers in substantially the same way as the cooling tubes are arranged in U.S. Pat. No. 4,321,234, and a catalyst is packed around the heat-exchanging tubes so as to form at least two catalyst-packed reaction chambers, and (3) a feed gas is flowed in series through the plurality of catalyst-packed reaction chambers and the feed gas flows radially through each of the catalyst-packed reaction chambers. According to the present invention, the linear velocity of the gas stream that flows through each reaction chamber is faster than the gas flow velocity achieved using the reactor of U.S. Pat. No. 4,321,234, and the overall heat-transfer coefficient of the heat flow that passes through the walls of each heat-exchanging tube is thus made greater, thereby making it possible to reduce the number of the heat-exchanging tubes that are needed and to reduce the size of the reactor, while also achieving the optimum temperature distribution for effecting the reaction along the flow path of the gas in each of the catalyst beds.

According to one aspect of this invention, there is provided a method for carrying out a catalytic chemical reaction, in the presence of a granular catalyst, under conditions such that both the starting materials and the reaction product are gaseous at the temperatures and pressures employed for the reaction, which method comprises:

(a) providing a cylindrical, upright reactor which comprises an outer shell or enclosure, a gas-permeable cylindrical outer catalyst retainer disposed inside the outer shell, a gas-permeable cylindrical inner catalyst retainer disposed inside of and coaxial with the outer catalyst retainer, which catalyst retainers define an annular intercylinder space therebetween, at least two vertical partition walls disposed within the intercylinder space and extending in respective radial directions and dividing the intercylinder space into separate chambers which are respectively sectorial in horizontal cross-section view, a plurality of vertical heat-exchanging tubes provided in at least one of the chambers, said tubes being arranged in a plurality of partially circular groups or arrays which are concentric with the common axis of both the outer and inner catalyst retainers, the catalyst being packed in at least two of said chambers so as to form at least two catalyst-packed reaction chambers; and (b) causing the gaseous starting materials to flow in radial directions and in series through the catalyst-packed reaction chambers, while causing a heat exchange fluid having a desired temperature to pass through each of the heat-exchanging tubes, thereby allowing the catalytic reaction to proceed, whereby said starting materials react to form a gaseous product.

According to another aspect of this invention, there is provided a reactor having a cylindrical, upright, outer shell having top and bottom walls at its upper and lower ends and which is adapted for carrying out a catalytic reaction, in the presence of a granular catalyst, under conditions such that both the starting materials and the reaction product are gaseous at the temperatures and pressures employed for the reaction, said reactor comprising:

(a) a gas-permeable cylindrical outer catalyst retainer disposed inside of and spaced from the inner wall of the outer shell, thereby defining an outer first intercylinder space or outer gas flow passage between the inner wall of the outer shell, the outer wall of the outer catalyst retainer and the top and bottom walls of the outer shell;

(b) a gas-permeable cylindrical inner catalyst retainer coaxial with and disposed inside of the outer catalyst retainer, thereby defining a second annular intercylinder space between the outer catalyst retainer, the inner catalyst retainer and the top and bottom walls of the outer shell;

(c) at least two vertical partition walls extending radially between the inner and outer catalyst retainers and dividing the second intercylinder space into a selected number of separate chambers which are respectively sectorial or in the form of a segment of an annulus, in horizontal cross-section view;

(d) a plurality of vertical heat-exchanging tubes provided in at least one of the chambers, said tubes being arranged in partially circular groups or arrays wherein the partially circular groups are radially spaced from each other and are concentric with the common central axis of both of the outer and inner catalyst retainers and the heat-exchanging tubes in each partially circular group are circumferentially spaced from each other, so as to provide at least one reaction chambers containing said tubes;

(e) at least one vertical inner barrier wall provided within the inner catalyst retainer and spaced from the inner wall of the inner catalyst retainer, said barrier wall being adapted to change the direction of the flow of the gas stream, so as to define at least one inner gas flow passage in the space between the inner wall of the inner catalyst retainer and the outer face of the barrier wall(s);

(f) at least one heat-exchanging fluid collecting header and at least one heat-exchanging fluid distributing header provided respectively at opposite vertical ends of each of the reaction chambers having said tubes and connected to the opposite ends of the heat-exchanging tubes that extend through that reaction chamber, in order to collect and distribute, respectively, the heat-exchanging fluid which passes through said heat-exchanging tubes;

(g) at least one heat-exchanging fluid outlet pipe and at least one heat-exchanging fluid inlet pipe extending through either one or both of the top and bottom walls and connected to at least one of the collecting headers and at least one of the distributing headers, respectively;

(h) at least one catalyst-charging pipe and at least one catalyst-discharging pipe communicating with each of the reaction chambers and extending through the top and bottom walls, respectively;

(i) one or more radially extending vertical dividing walls disposed in at least one of said first outer gas flow passage and said inner gas flow passage, with each dividing wall being connected to one of said vertical partition walls, thereby to define the flow path of the gas so that the gas is caused to flow in series through the two or more reaction chambers in radial directions, the gas alternately flowing radially inwardly and radially outwardly in successive chambers, the direction of the flow in the first chamber being radially outwardly when the starting reaction gas is introduced at the radially inward end of said first chamber, and the flow direction in the first chamber being radially inwardly when the starting reaction gas is introduced at the radially outward end thereof; and (j) at least one reaction gas inlet and at least one product gas outlet provided in communication with the first chamber and the last chamber of the series, respectively.

Other objects, features and advantages of the present invention will become apparent from the following description and the appended claims, taken in conjunction with the accompanying drawings.

BRIEF DESCRIPTION OF THE DRAWINGS

In the accompanying drawings:

FIGS. 4A to 4F illustrate schematically the flow path of a gas through different reaction chambers, wherein FIG. 4A illustrates a prior art reactor and FIGS. 4B to 4F indicate reactors according to the present invention;

FIG. 5 is a vertical cross-sectional view of one embodiment of a reactor according to this invention;

FIG. 13 is a horizontal cross-sectional view of the reactor taken on line XIII—XIII in FIG. 12.

DETAILED DESCRIPTION OF THE INVENTION

Figure 1:
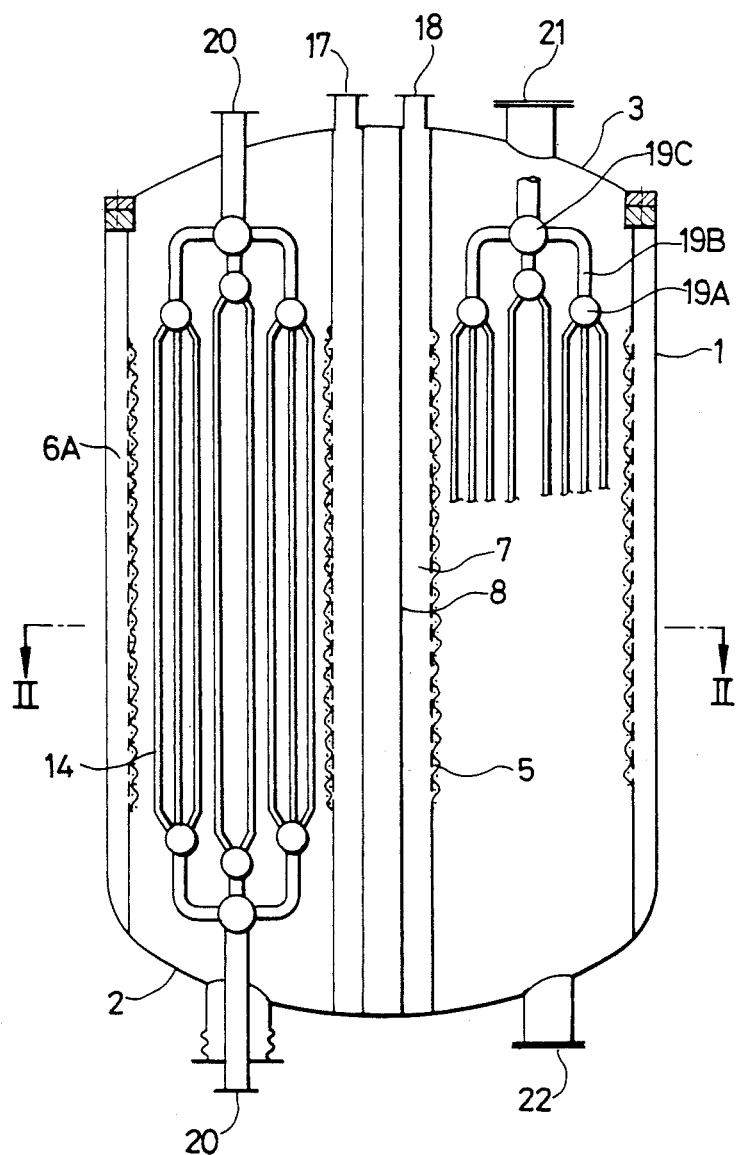
FIG. 1 is a schematic vertical cross-sectional view of a reactor for describing the principle of the present invention.

In a catalytic reaction, normally there are optimum temperatures that should be maintained at various locations in the catalyst bed through which the feed gas is passed. Such optimum temperatures are determined taking into account the reaction velocity and the amounts of by-products produced in the reaction. For example, during the catalytic synthesis of ammonia under a constant pressure, using a 3:1 mixture (mols) of hydrogen gas and nitrogen gas as the feed gas, the ammonia reaction velocity at each location in a catalyst bed can be approximately expressed by the following equation:

$$V = K \times (C_e - C_a) = K \times \Delta C \tag{1}$$

wherein,
V = the ammonia reaction velocity (kg·mole/hour/cat.m$^3$);
$C_e$ = the mole fraction of the equilibrium concentration of ammonia, at the reaction temperature and pressure, at a given location in the catalyst bed;
$C_a$ = the mole fraction of the concentration of ammonia already present at the same location as above;

K = the reaction velocity coefficient; and

ΔC = the difference between the equilibrium concentration of ammonia $C_e$ at the above location and the actual concentration $C_a$ at the same location.

According to the above equation, it will be understood that when the temperature at a given location A in a catalyst bed becomes higher, the reaction velocity coefficient K increases, but the equilibrium concentration of ammonia $C_e$ decreases, thereby sharply reducing the difference ΔC between the equilibirium concentration and the actual concentration and, correspondingly, lowering the reaction velocity V. When the temperature at the location A becomes lower, on the contrary, the difference ΔC between the equilibrium concentration of ammonia and its actual concentration becomes greater, but the reaction velocity coefficient becomes smaller, thereby again lowering the reaction velocity V. The above nature of the ammonia synthesis reaction suggests maintaining a specific temperature at which the velocity of the reaction to produce ammonia reaches a maximum for each concentration level of ammonia that can be actually present at the location A.

Although no by-products are produced in the ammonia synthesis reaction discussed above, there are some reactions which are accompanied by the production of by-products, such as higher alcohols in the case of a methanol synthesis reaction. In the latter case, there may, in some instances, be a particular temperature at which the methanol reaction velocity reaches a maximum while the yields of by-products are low, in addition to a temperature which permits the reaction velocity, including the reaction velocity for each by-product, to reach a maximum. In view of the foregoing, it is very important to carry out such a catalytic reaction while maintaining the temperatures at various locations along the path of flow of the feed gas through a catalyst bed at levels which afford the maximum reaction velocities (hereinafter called "the optimum temperatures") in order efficiently to obtain a large amount of the intended reaction product using a small reactor, and with a low level of byproduct formation. Since the above-described optimum temperature at each location in the catalyst bed varies depending on the concentration of the desired reaction product in the gas which is in contact with the catalyst at that location, an optimum temperature distribution curve showing the distribution of optimum temperatures can be prepared by plotting the optimum temperatures for the entire gas flow path from the inlet of the catalyst bed to the outlet of the catalyst bed on a graph wherein the horizontal axis is the distance along the gas flow path from the gas inlet of the catalyst bed to the various locations in the catalyst bed, and the temperatures are plotted along the vertical axis of the graph. Although this optimum temperature distribution curve may in some rare instances indicate a constant temperature from the inlet to the outlet of the catalyst bed, it generally takes the form of a curve which varies in accordance with the type of reaction, the type of catalyst used, the reaction pressure, and similar factors. The above-mentioned optimum temperature distribution curve will hereinafter be called the "optimum temperature distribution".

As mentioned above, a number of reactors of the type wherein a gas is caused to flow in radial directions through an intercylinder catalyst bed have heretofore been known. However, almost no reactors have been designed taking into consideration the optimum temperature distribution for the reaction. As a corollary to this, such prior art reactors were also not satisfactory from the viewpoint of reducing the sizes of such reactors.

A reactor capable of achieving the optimum temperature distribution was proposed in the aforementioned Japanese Patent Laid-Open No. 149640/1980 and its counterpart, U.S. Pat. No. 4,321,234. This proposal discloses a method for carrying out a catalytic reaction which comprises arranging a number of cooling tubes, which extend vertically in the above-described intercylinder catalyst bed, in circular groups concentric with the common central axis of the gas-permeable catalyst retainers respectively disposed radially outside of and radially inside of the intercylinder catalyst bed. The feed gas is flowed, only once and uniformly in all radial directions, through the catalyst bed, i.e., the feed gas flows once through the entire cross section of the catalyst bed, while a cooling fluid is flowed through the cooling tubes, thereby maintaining the temperatures at various locations along the flow path of the feed gas from the inlet of the catalyst bed to the outlet of the catalyst bed at the corresponding optimum temperatures for a given exothermic reaction. The above proposal is also directed to a reactor useful in the practice of the above method.

The present inventors have found that, by providing radially extending vertical partition walls in the intercylinder catalyst bed of the above-described reactor, whereby to divide the intercylinder catalyst bed into a plurality of separate reaction chambers, and then passing the feed gas substantially in series through at least two of the separate reaction chambers, the flow velocity of the gas can be increased without changing the overall space velocity of the reactor as a whole, per se, and, at the same time, the overall heat-transfer coefficient during heat exchange with the heat-exchanging fluid that flows through the heat exchanging tubes can be made greater, therby permitting a reduced number of heat-exchanging tubes to be used and, correspondingly, permitting the reactor to be made smaller, while obtaining results which are at least as good as those achieved by the above-described reactor of U.S. Pat. No. 4,321,234.

The present invention will now be described with reference to FIGS. 1 and 2, in which numeral 1 indicates an upright cylindrical outer shell of the reactor. The cylindrical outer shell 1 is provided with a bottom wall 2 and a top wall 3. Inside the outer shell 1, there are provided a gas-permeable, outer, catalyst retainer 4 and an inner catalyst retainer 5 within the outer catalyst retainer 4, both retainers 4 and 5 being coaxial with each other and with the central axis of the outer shell. The outer annular space 6 defined between the outer shell 1, the outer catalyst retainer 4 and the bottom and top walls 2, 3 provides an outer gas flow passage. The outer gas flow passage is divided by outer dividing walls 15 into passages 6A and 6B. Inside the inner catalyst retainer 5, there are provided an inner circular barrier wall 8 and inner radially extending dividing walls 16 which extend radially outwardly from the circular barrier wall 8 to the inner catalyst retainer 5. The space defined by the inner catalyst retainer 5, barrier wall 8 and bottom and top walls 2, 3 is thereby divided into a plurality of inner gas flow passages 7, 7A and 7B by the dividing walls 16. The space defined by the outer catalyst retainer 4, inner catalyst retainer 5 and bottom and top walls 2,3 is divided by radially extending vertical partition walls 9 into a desired number of chambers (4 in the illustrated example) 10, 11, 12 and 13, which are respectively sectorial in horizontal cross section, that is, in the shapes of segments of an annulus.

These chambers 10, 11, 12 and 13 are used either as chambers which have a catalyst packed therein or as chambers for use in heat exchange, as will be described below. In the example illustrated in FIGS. 1 and 2, all of these chambers 10, 11, 12 and 13 are used as reaction chambers and, in each of them, heat-exchanging tubes 14 are arranged and a catalyst is packed. In each of these chambers, gas is cuased to flow in a radial direction. It is necessary to determine, in advance, the order of the reaction chambers, that is, the order in which the gas is caused to pass in series through the reaction chambers 10, 11, 12 and 13, and the direction of the flow of the gas in each reaction chamber.

In the illustrated example, the reaction chambers are used in the order of (1) radially outward flow in the first reaction chamber 10, (2) radially inward flow in the second reaction chamber 11, (3) radially outward flow in the third reaction chamber 12, and (4) radially inward flow in the fourth reaction chamber 13. By causing the gas in the first chamber 10 to flow radially outwardly from the inner gas flow passage 7A to the outer gas flow passage 6A, the orders of gas flow through the remaining reaction chambers and the direction of flow of the gas in each reaction chamber are determined. In each reaction chamber, heat-exchanging tubes 14 are arranged in a number of partially circular groups, which groups are concentric with the common central axis of the shell 1 and the catalyst retainers 4 and 5. That is, the heat-exchanging tubes of each group are equidistantly radially spaced from the common central axis of the reactor and they extend along an arc, the length of which depends on the arcuate extent of the reaction chamber in which that group of tubes is disposed, for example, 90° in the reactor of FIG. 2. Furthermore, in order to control the order of flow of the gas through the reaction chambers, there are provided the radially outwardly extending outer dividing walls 15 which divide the outer gas flow space into outer gas flow passages 6A and 6B. The outer dividing walls 15 are radially aligned with and define extensions of the partition wall 9 between the first and fourth reaction chambers 10,13 and the partition wall 9 between the second and third reaction chambers 11,12. The radially extending inner dividing walls 16 that define the inner gas flow passages 7,7A and 7B are respectively located on (1) extensions of the partition wall 9 between the first and second reaction chambers 10,11, (2) the partition wall 9 between the third and fourth reaction chambers 12,13 and (3) the partition wall 9 between the fourth and first reaction chambers 13,10. In accordance with the gas flow path established as described above, a feed gas inlet 17 and a reaction product gas outlet 18 are respectively provided at the upper or lower ends of the inner gas flow passages 7A and 7B, respectively, said inlet 17 being in communication with the first reaction chamber 10, and said outlet 18 being in communication with the fourth reaction chamber 13.

Figure 2:
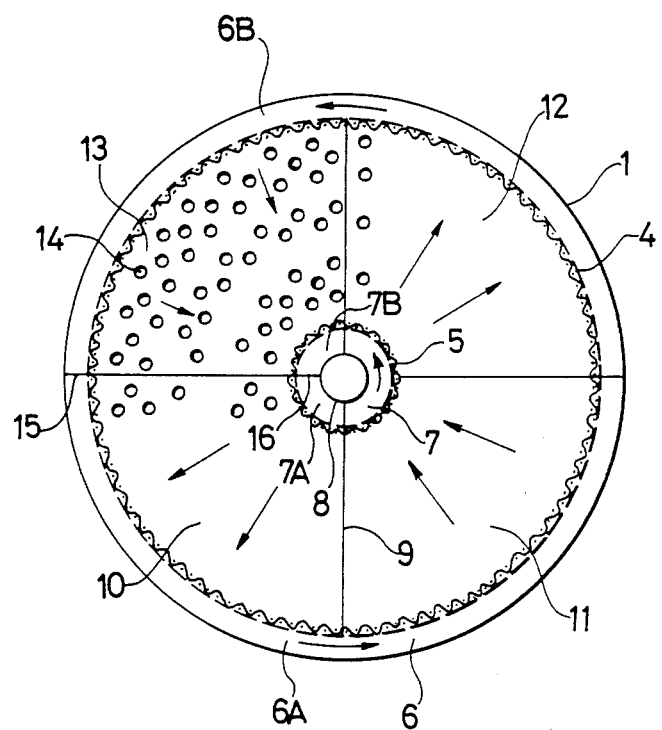
FIG. 2 is a horizontal cross-sectional view of the reactor taken along the line II—II in FIG. 1.

In the example illustrated in FIGS. 1 and 2, the upper and lower ends of all of the heat-exchanging tubes 14 arranged in each of the reaction chamber 10,11,12 and 13, as described above, are connected to distributing header structures and collecting header structures. In the illustrated embodiments, the header structures are comprised of primary headers 19A connected to the tubes 14, secondary headers 19C and pipes 19B which connect the primary headers to the secondary headers.

The secondary headers 19C of the distributing header structures and collecting header structures are connected, respectively, to fluid inlet and outlet pipes 20. The foregoing distributing-collecting system is reversible such that the flow of heat exchange fluid through the heat-exchanging tubes 14 can run from top to bottom or from bottom to top in the embodiment shown. Further, the heat-exchanging tubes 14 in the respective chambers 10,11,12 and 13 are connected to different header structures and tubes 20 so that the heat exchange fluid is separately supplied to the heat-exchanging tubes 14 in each of the chambers 10,11,12 and 13, there being one inlet pipe and one outlet pipe 20 for each chamber. Through the top wall 3 of the reactor there is provided a catalyst-charging pipe 21 for each reaction chamber 10,11,12 and 13, and a catalyst-discharging pipe 22 is provided through the bottom wall 2 for each reaction chamber 10,11,12 and 13. In order to operate the reactor of the present invention having the structure described above, a catalyst suitable for the intended reaction is packed in each of the reaction chambers 10,11,12 and 13 through the corresponding catalyst-charging pipe 21 prior to use of the reactor.

The reactor of this invention can be used to conduct both exothermic and endothermic reactions so long as the feed gas and the product gas remain gaseous prior to, during and after the reaction. When the reactor is used to carry out an exothermic reaction, the heat-exchanging fluid that passes through the heat-exchanging tubes 14 serves as a cooling fluid. Thus, the temperature of the cooling fluid must be lower than the temperatures of the catalyst and the reaction gas during the reaction. When the reactor of this invention is used to conduct an endothermic reaction, the heat-exchanging fluid that flows through the heat-exchanging tubes 14 serves as a heating fluid. Here, the temperature of the heating fluid should be higher than the temperatures of the catalyst and reaction gas during the reaction.

Figure 3:
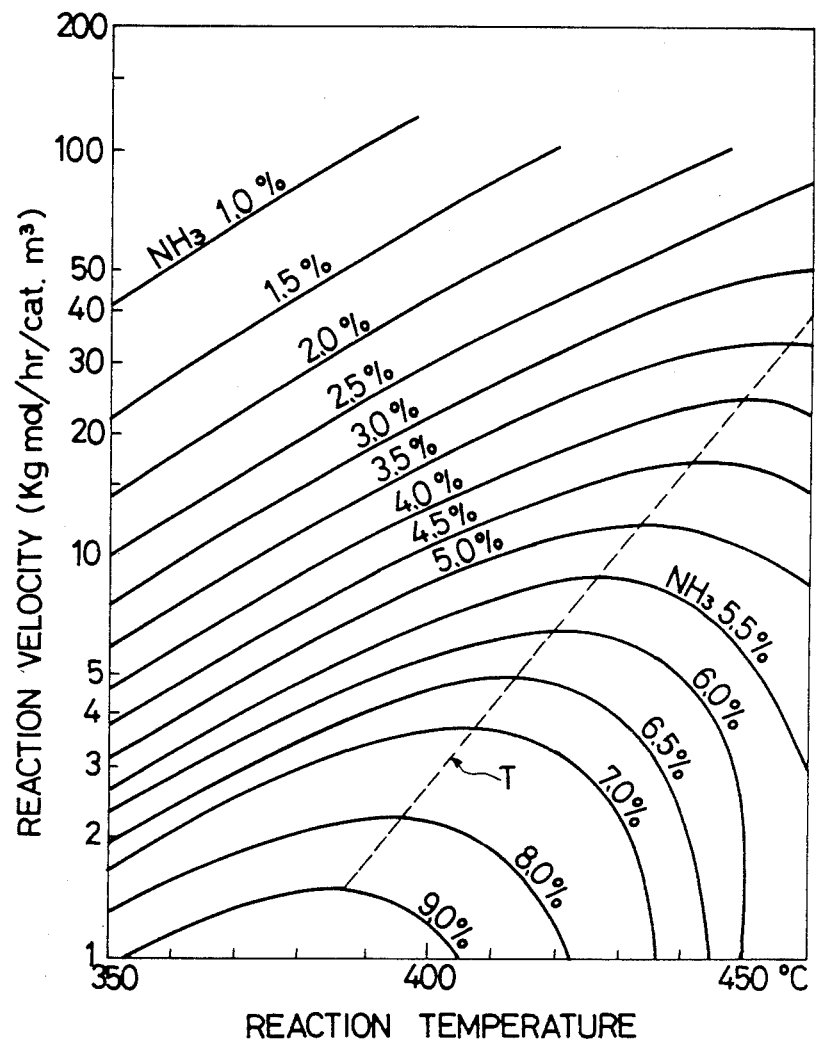
FIG. 3 is a reaction velocity diagram of an ammonia synthesis reaction.

FIG. 3 illustrates diagrammatically the relationship between the reaction velocity and the temperature in a reaction for the synthesis of ammonia, in the presence of a commercially available catalyst, at a pressure of 45 kg/cm$^2$G, from a synthesis gas comprising hydrogen gas and nitrogen gas mixed in a molar ratio of 3:1 and including 13.6 mole % of an inert gas. Each reaction velocity obtained in accordance with the equation (1) for each of the indicated NH$_3$ concentrations and for each temperature in the range of 350°–460° C. is plotted to form a single curve. The curves in FIG. 3 respectively show the reaction velocity levels of an ammonia synthesis reaction using a commercially available catalyst for corresponding concentrations of ammonia which are shown above each corresponding curve. Each curve for an ammonia concentration of 4.0% or higher (all designations of percent in the following refer to mole % unless specified otherwise) has a single temperature at which the reaction velocity level becomes the highest, which is the optimum temperature for that ammonia concentration. For the reasons mentioned above with reference to the equation (1), the reaction velocity according to each of the curves is lowered when the temperature is changed away from the optimum temperature, regardless of whether the temperature is raised or lowered. When the ammonia concentration is 3.0% or less, the temperature which brings about the fastest reaction velocity is above 460° C. Therefore, the optimum temperatures of such curves are outside of the diagram depicted in FIG. 3.

In FIG. 3, the line T has been obtained by connecting the points on the foregoing reaction velocity curves at which the corresponding reaction velocity levels for each curve are highest. In the case of a catalytic ammonia synthesis, a feed gas is charged into a catalyst bed and is brought into contact with the catalyst so as to form ammonia, whereby a reaction product gas having an increased ammonia concentration leaves the catalyst bed. The amount of the catalyst required for the reaction can be minimized provided that, during the course of the reaction, the temperatures in the catalyst bed are maintained at levels giving the maximum reaction velocity level for the concentration of ammonia present at each location. In other words, the temperatures in the foregoing reaction, at each location, should correspond to points which fall on the line T. This means that the optimum temperature distribution in the catalyst bed may be represented by a curve obtained by modifying the curve T in such a way that the distances from the inlet of the catalyst bed, along the flow path of the gas, to locations in the catalyst bed are represented by the horizontal axis and temperatures are represented by the vertical axis.

Since an ammonia synthesis reaction is an exothermic reaction, it is necessary to remove the resulting reaction heat so that the temperatures in the catalyst bed are kept at the optimum temperatures corresponding to the concentrations of ammonia actually present at each location therein. In order to maintain the optimum temperature distribution throughout the catalyst bed, the temperatures of the reaction gas and the catalyst are lowered along the curve T as the reaction proceeds and the concentration of ammonia present in the reaction gas becomes higher. To achieve this, it is necessary to provide a cooling heat-transfer surface in the catalyst bed. The heat-transfer area required per m³ of the catalyst for cooling the catalyst and the reaction gas is the same at locations where the ammonia concentrations, are the same, but such heat transfer areas required are different at locations where the ammonia concentrations are different.

It is thus possible to maintain locations of the same ammonia concentration at the same optimum temperature and to establish, as a whole, the above-described optimum temperature distribution in the catalyst bed, by flowing the feed gas uniformly in radial directions through a vertical, intercylinder, catalyst bed wherein a plurality of vertically extending heat-exchanging tubes are arranged in a plurality of circular groups, each circular group being concentric with the central axis of the catalyst bed and the numbers of heat-exchanging tubes in the respective circular arrays thereof being set at the optimum number thereof needed as determined by the distance thereof from the gas inlet of the catalyst bed, and causing a cooling fluid to flow through the heat-exchanging tubes. When a gas is caused to flow through an intercylinder catalyst bed from the radially inside thereof to the radially outside thereof, the circumferential lengths of the circles on which the heat-exchanging tubes are arranged are longer in the direction toward the radially outer side of the intercylinder catalyst bed. Therefore, it is possible to position more heat-exchanging tubes on circles near to the radially outer side than on circles near to the radially inner side, thereby causing the temperature of the reaction gas to successively drop as it moves from the radially inner side to the radially outer side of the catalyst bed and achieving the optimum temperature distribution in the catalyst bed as mentioned above. The achieving of the optimum temperature distribution can lower the reaction pressure at which, for example, ammonia or methanol is synthesized. In some instances, it may be desirable to cause the feed gas to flow in the opposite direction, namely, from the radially outer side to the radially inner side, depending on the type of reaction being run.

The above-described Japanese Patent Laid-Open No. 149640/1980, and its counterpart, U.S. Pat. No. 4,321,234, disclose a reaction method and a reactor useful in the practice of a reaction method based on the principles described in the foregoing paragraph. However, in this method the feed gas is caused to pass simultaneously, only once in all radial directions, through an annular catalyst bed. Thus, the linear velocity of the gas that flows in a direction perpendicular to the lengthwise direction of each heat-exchanging tube is slow and the overall heat-transfer coefficient of the heat flowing through the walls of the heat-exchanging tubes becomes smaller, such that many heat-exchanging tubes are required on each circle.

As mentioned above, this invention ameliorates the above-described drawbacks of the foregoing previously proposed reaction method. Since the linear velocity of the gas stream can be increased and the overall heat-transfer coefficient can be increased by dividing the intercylinder catalyst bed, by means of vertical partition walls 9, into a plurality of reaction chambers as depicted in FIGS. 1 and 2, it becomes possible to reduce the number of heat-exchanging tubes while using the same amount of catalyst and still maintaining an optimum temperature distribution in each reaction chamber. For example, when the catalyst bed is divided into four reaction chambers of equal size, as shown in FIGS. 1 and 2, the linear velocity of the gas is four times faster and the overall heat-transfer coefficient is at least substantially doubled. Thus, the number of heat-exchanging tubes can be reduced by at least one-half, compared to the number required for the same process according to the foregoing previously proposed method. This reduction in the number of heat-exchanging tubes conserves heat-exchanging tubes, per se, and also allows the reactor to be reduced in size by the volume which would have been occupied by the additional heat-exchanging tubes. The improvement of the present invention, in addition, allows the structure of the above-mentioned collecting and distributing headers to be simplified. Thus, the materials required for the construction of the reactor can be saved and the manhours required for the manufacture of the reactor can also be reduced, thereby lowering the overall construction cost of the reactor.

A further advantage of the reactor according to this invention is that, as a result of the increased overall heat-transfer coefficient of the heat-exchanging tubes, it becomes possible to have sufficient heat-exchanging capacity even at locations close to the radially inner side of the intercylinder catalyst bed, thereby permitting the designer to freely select whether to flow the gas either radially outwardly or radially inwardly through the intercylinder catalyst bed.

Many embodiments are contemplated as to both the reaction method and the reactor according to this invention. The present invention will hereinafter be described in detail with reference to illustrative additional embodiments.

FIGS. 4A to 4F are schematic horizontal cross-sectional views of various intercylinder catalyst bed arrangements. FIGS. 4A to 4F will be described with reference to the way a gas passes through the catalyst bed.

Figure 4A:
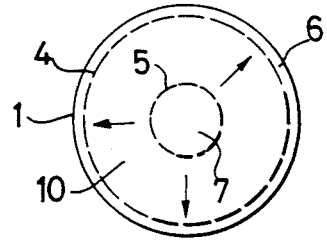

FIG. 4A exemplifies the method which has already been proposed in Japanese Patent Laid-Open No. 149640/1980 and its counterpart, U.S. Pat. No. 4,321,234. In FIG. 4A, there is provided only one reaction chamber, which chamber comprises an intercylinder chamber 10 defined by a gas-permeable, cylindrical outer catalyst retainer 4, which is disposed inside an outer shell 1, and a gas-permeable, cylindrical inner catalyst retainer 5 provided within the outer catalyst retainer 4. A plurality of vertically extending heat-exchanging tubes (not shown) are arranged in the reaction chamber in circular groups which are concentric with the common central axis of both of the catalyst retainers 4 and 5. A feed gas is supplied to either the outer gas flow passage 6 or the inner gas flow passage 7 and is caused simultaneously and uniformly to flow in all radial directions, either radially outwardly or radially inwardly. That is, the gas makes one pass through the entire annular extent of the cross section of the catalyst bed.

Figure 4B:
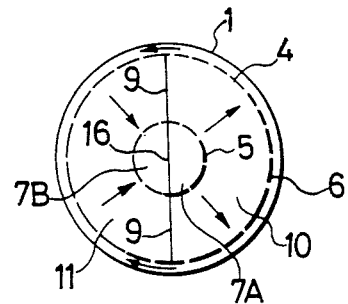

In the present invention, the feed gas is caused to pass in series through at least two separate reaction chambers which are provided by dividing the intercylinder space 10 into portions having the shapes of segments of an annulus, as will be described below. FIG. 4B illustrates an embodiment of the invention in which the intercylinder catalyst bed is divided by two radially extending vertical partition walls 9 into two reaction chambers 10,11. In the illustrated embodiment, the central part of the reactor within the inner catalyst retainer 5 is not utilized, for example, as a space for installing a heat-exchanger adapted to preheat the feed gas. Thus, no inner barrier wall 8 is provided. Instead, an inner dividing wall 16 divides the inner gas flow passage 7 into two passages 7A and 7B. The dividing wall 16 is connected to and extends between the radially inner ends of the partition walls 9. The feed gas is first caused to flow radially outwardly from the adjoining inner flow passage 7A through the first reaction chamber 10 from the inside to the outside thereof. The gas then travels through the outer gas flow passage 6, and subsequently flows through the second reaction chamber 11 from the outside to the inside thereof to the adjoining inner flow passage 7B.

Figure 4C:
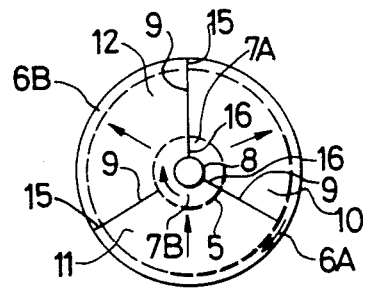

FIG. 4C depicts a further embodiment in which the intercylinder catalyst bed is divided into three equal parts. In this embodiment, a cylindrical inner vertical barrier wall 8 is provided in order that the central space thereof can be used as a space for installation of a heat exchanger for preheating the feed gas with heat from the high temperature product gas. The preheating heat-exchanger, which is provided inside the inner barrier wall 8, is not shown in FIG. 4C but will be discussed later. Radially outwardly extending outer dividing walls 15 and radially extending inner dividing walls 16 are provided to define the outer gas flow passages 6A, 6B and the inner gas flow passages 7A, 7B, respectively. Thus, the feed gas passes radially outwardly through the first reaction chamber 10 from the inner gas flow passage 7A, flows clockwise through the outer gas flow passage 6A, flows radially inwardly through the second reaction chamber 11, flows through the inner gas flow passage 7B, then flows radially outwardly through the third reaction chamber 12, and finally flows out of the reactor via the outer gas flow passage 6B which is in communication with the third reaction chamber 12.

In the above two embodiments of FIGS. 4B and 4C, the intercylinder catalyst beds are each located in reaction chambers of the same size.

Figure 4D:
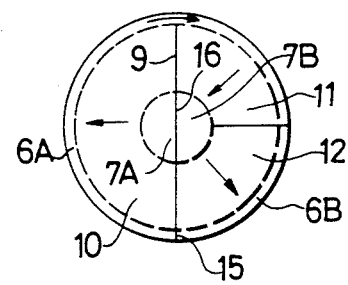

FIG. 4D depicts a further embodiment of the invention in which the intercylinder catalyst beds are located in reaction chambers of different sizes. In the illustrated embodiment, the feed gas flows radially outwardly through the first, semi-circular, reaction chamber 10 from the inner gas flow passage 7A, flows clockwise through the outer gas flow passage 6A, flows radially inwardly through the second reaction chamber 11, flows through the inner gas flow passage 7B, and then flows radially outwardly through the third reaction chamber 12 to the outer gas flow passage 6B.

Figure 4E:
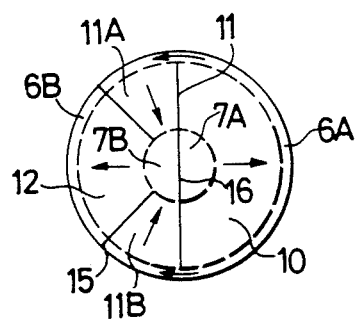

In FIG. 4E, the reaction gas is allowed to flow in parallel through two of the total of four reaction chambers. The feed gas is caused to flow radially outwardly through the first reaction chamber 10 from the inner flow passage 7A and the resultant gas stream is then divided into two portions which flow clockwise and counterclockwise, respectively, in the outer gas flow passage 6A. Thereafter, the thus-divided two gas streams pass in parallel flows and radially inwardly through two second reaction chambers 11A and 11B. These two gas streams are combined in the inner gas flow passage 7B and the resulting single gas stream passes radially outwardly through the third reaction chamber 12 to the outer gas flow passage 6B.

Figure 4F:
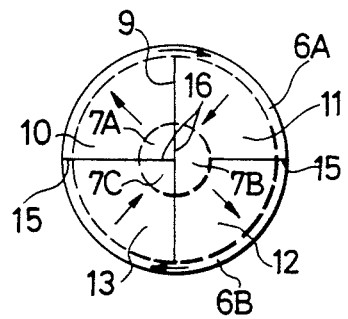

In FIG. 4F, the gas flows from the inner flow passage 7A radially outwardly through the first reaction chamber 10, then flows clockwise through the outer flow passage 6A, flows radially inwardly through the second reaction chamber 11, flows through the inner flow passage 7B, flows radially outwardly through the third reaction chamber 12, flows clockwise through the outer flow passage 6B, and flows radially inwardly through the fourth reaction chamber 13 to the inner flow passage 7C.

In the above embodiments of this invention, radially extending outer dividing walls 15 and radially extending inner dividing walls 16 are provided to define the outer gas flow passages 6A,6B and the inner gas flow passages 7A,7B,7C in order to control the flow path of the gas as described above. In the above-described embodiments, the gas is caused to flow radially outwardly in each of the first reaction chambers 10. However, it is within the scope of the invention to reverse the direction of the gas flow in each of the first reaction chambers 10 described above. When the gas flows in the opposite direction in each of the first reaction chambers 10, the directions of flow of the gas in the other reaction chambers are also correspondingly reversed. To effect this change, it is necessary to change the positions of the dividing walls 15 and 16 in the outer gas flow passages and inner gas flow passages, respectively. The details of such changes are obvious to those skilled in the art from the foregoing description and are thus omitted here. Other equivalent ways of partitioning the catalyst bed, in addition to the methods shown in FIGS. 4B to 4F will further be obvious to those skilled in the art.

In the present invention, it is not always essential to use, as reaction chambers, all of the chambers which are formed by dividing the intercylinder space used as a catalyst bed in Japanese Patent Laid-Open No. 149640/1980 by vertical partition walls as described above, which chambers are of the shapes of segments of an annulus in horizontal cross section. Some of the chambers can be used as spaces for installing heat-exchangers for preheating the feed gas as described above and/or as chambers equipped with no or only a few heat-exchanging tubes and packed with a catalyst so as to permit the reaction heat to raise the temperature of the feed gas passing therethrough to a desired temperature. The latter use of the chambers is effective as a method for further preheating a feed gas, which has already been preheated to a certain extent, to an optimum reaction temperature by the exothermic heat of the reaction while making use of the fact that, in an exothermic reaction, such as the ammonia synthesis described above with reference to FIG. 3, the optimum reaction temperature is considerably higher than the lower limit of the working temperature range of the catalyst in the initial stage of the synthesis reaction, in which stage the concentration of ammonia present in the reaction gas is low. The above preheating method is carried out by effecting the reaction as a substantially adiabatic reaction, by minimizing the removal of exothermic reaction heat to a considerable extent.

Alternatively, it is also possible to divide the intercylinder space into, for example, two, four, or six chambers serving as non-adiabatic reaction chambers containing heat-exchanging tubes for controlling the temperature of the gas and two chambers serving as adiabatic reaction chambers as described above, so as to establish two series flows, thereby dividing the feed gas into two portions and causing each of these portions separately to flow in series through an adiabatic reaction chamber and at least one reaction chamber containing heat-exchanging tubes (non-adiabatic reaction chamber). The above method is useful when the amount of the feed gas is to be considerably reduced for convenience of operation, because the operation can still be continued by flowing the feed gas through and maintaining the optimum temperature distribution in only one of the series of one adiabatic reaction chamber and at least one non-adiabatic reaction chamber, and by stopping the flow of the feed gas to the other series.

The heat-exchange fluid which is passed through the heat-exchanging tubes in the present invention can be either a gas, a liquid, or a mixture of gas and liquid. This fluid serves as a cooling fluid when the chemical reaction being carried out in accordance with this invention is an exothermic reaction. Thus, a cooling fluid at a temperature lower than the reaction temperature is used as mentioned above. Correspondingly, this fluid serves as a heating fluid when the chemical reaction is an endothermic reaction. A fluid which is a substance that is liquid at or below 12° C. is preferred.

When the heat-exchanging fluid is a cooling fluid, the fluid can be used in two ways, namely, by making use of the sensible heat absorbed as the temperature of the fluid rises or by making use of the latent heat of vaporization of a liquid fluid without allowing the temperature of the liquid to rise. When a gas is used as the cooling fluid, it is only possible to make use of the sensible heat absorbed, which increases the temperature of the gas. When such a cooling gas is used, it is necessary to cause the cooling gas to pass through the heat exchange tubes in a great volume because the cooling gas can absorb only a relatively small quantity of heat per unit volume. It is thus suitable to use such a cooling gas only when the chemical reaction gives off a relatively small quantity of heat. It is more effective to use such a cooling gas in a pressurized state. The cooling gas can be caused to pass through the heat-exchanging tubes from top to bottom or in the reverse direction.

When a liquid is used as the cooling fluid, it is possible to use both the sensible heat and the latent heat of vaporization thereof. Such a cooling liquid can be used in much the same way as the above-mentioned cooling gas when the sensible heat of the cooling liquid is utilized. A greater cooling effect results from the utilization of the sensible heat of such a cooling liquid, compared with a cooling gas, because the quantity of heat absorbed when the temperature of a liquid increases is far greater than the corresponding heat absorbed by a cooling gas.

When the chemical reaction is an exothermic reaction, the heat produced by the reaction can be effectively utilized for preheating the starting materials. For example, heat can be used for preheating pressurized natural gas, which can optionally contain hydrogen gas, used in a steam-reforming reaction for producing ammonia using natural gas as a starting material, or for preheating water prior to producing steam therefrom when water is used as a cooling fluid.

In the last embodiment as mentioned above, it is preferred that the cooling liquid be at its boiling temperature at its pressure in the last reaction chamber through which the feed gas stream passes.

When the chemical reaction being carried out in the reactor is an endothermic reaction, a heating fluid having a temperature higher than the temperature at which the endothermic reaction occurs is utilized, which heating fluid is produced in a separate step. In an endothermic reaction which proceeds at a very high reaction temperature, it is particularly effective to use the sensible heat of a heating gas for heating the reaction system. In this case, it is desirable to minimize the difference in pressure between the reaction pressure and the pressure of the heating gas. In addition, the final reaction chamber can be used to preheat the heat-exchanging fluid when the fluid is in a liquid form, regardless of whether the reaction is exothermic or endothermic.

In the present invention, it is far more efficient to use the latent heat of vaporization or condensation of a fluid caused to pass through heat-exchanging tubes than the sensible heat of the fluid. When an exothermic chemical reaction is carried out in accordance with this invention, the latent heat of vaporization of a cooling liquid can be utilized by causing the cooling liquid, the pressure of which cooling liquid has been adjusted to allow the cooling liquid to boil at a desired temperature lower than the reaction temperature of the exothermic chemical reaction, to flow upwardly through the heat-exchanging tubes. This causes the liquid to boil and evaporate in the heat-exchanging tubes so as to absorb the heat produced by the exothermic chemical reaction. In this case, it is desirable that the temperature of the cooling liquid be raised to its boiling point for the selected pressure when the cooling liquid enters the lower ends of the heat-exchanging tubes in the reaction chamber. Thus, in a typical case, the cooling liquid present in the heat-exchanging tubes is converted to a mixed phase comprising the liquid and its vapor, which is generated by absorbing the reaction heat. A high-temperature, high-pressure vapor of the liquid can be obtained by separating the mixed phases into a vapor phase and a liquid phase with a separator provided inside or outside the reactor and recirculating the liquid phase to the lower end of the heat-exchanging tubes without cooling it. It is particularly effective to utilize the latent heat of vaporization of a cooling liquid when the amount of heat produced by the reaction is very large, because the latent heat of vaporization of a liquid is great.

The unvaporized liquid can be recirculated to the lower ends of the heat-exchanging tubes from the separator by either the so-called natural recirculation method or the forced recirculation method. In the former method, the unvaporized liquid is recirculated by allowing it to flow by gravity downwardly, for example, by providing the separator at an upper portion of the reactor or at a location outside of and higher than the reactor and making use of the fact that the density of the above-mentioned mixed phase cooling fluid present in the heatexchanging tubes is less than that of the liquid per se. According to the forced recirculation method, the unvaporized liquid is recirculated using a pump. When the natural recirculation method is to be used, it is desirable to use a cooling fluid pressure of less than 150 kg/cm$^2$G because the density of the above-mentioned mixed phase, when the cooling liquid is boiling, becomes close to the density of the liquid per se so that natural recirculation of the unvaporized liquid becomes difficult when the pressure of the fluid becomes too high. Natural recirculation is preferred for the synthesis of ammonia from hydrogen and nitrogen. When the forced recirculation method is used, the foregoing limitation does not apply and pressures up to 200 kg/cm$^2$G or so can be employed.

The high-temperature, high-pressure vapor, such as steam, obtained in accordance with the method described above, can be used for heating another material or substance in another step or for generating power by means of a turbine. Either one of these methods allows the heat of an exothermic reaction to be recovered and used effectively. In this case, it is preferable to supply an additional amount of the cooling liquid into the heat-exchanging tubes in which the cooling liquid is vaporized, after preheating the cooling liquid to its boiling temperature in the heat exchanging tubes of the last reaction chamber. The utilization of latent heat in an endothermic reaction can be effected by supplying, as a heating fluid, the vapor of a liquid, the temperature of which vapor is higher than the endothermic reaction temperature, to the upper ends of heat-exchanging tubes, allowing the vapor to condense in the heat-exchanging tubes and using the thus-released heat of condensation to maintain the reaction gas and catalyst bed at the optimum temperature distribution for the endothermic reaction. In this case, it is generally necessary to use pressurized vapor to make the temperature of the vapor higher than the temperature of the reaction. The liquid produced by the condensation is drawn out from the lower ends of the heat-exchanging tubes.

When the reaction temperature is high, a high liquid pressure is required in all of the foregoing method of utilizing latent heat, regardless of whether the reaction is endothermic or exothermic. Therefore, heat-exchanging tubes having large wall thicknesses must be employed to accommodate the larger differences between the reaction pressure and the fluid pressure, leading in some instances to an economic disadvantage. In such a case, it is desirable to employ a liquid having a high boiling point so as to utilize the latent heat of the liquid at a lower pressure.

When the above method is applied to an exothermic reaction which is carried out at a relatively high temperature, the recovered reaction heat can be used effectively to produce electric power by subjecting the thus-produced vapor, which is at a high temperature but a relatively low pressure, and another liquid having a lower boiling point than the foregoing liquid which has been converted to vapor, to heat exchange by means of an additional separately provided heat-exchanger, obtaining the vapor of the other liquid, which vapor is at a slightly lower temperature but at a much higher pressure, and supplying the high pressure vapor of the other liquid to a turbine. Such a pressure conversion method is effective when a cooling liquid having a boiling point above 150° C. is used due to the high temperature of the reaction. In this case, the vapor at the lower pressure is condensed in the separately provided heat-exchanger. The resulting liquid condensate can be readily recirculated to the lower ends of the heat-exchanging tubes in the reaction chambers of the reactor.

The optimum temperature distributions in the reaction chambers generally differ from one reaction chamber to another, as should be apparent from the above description. Thus, the objects of this invention can be better achieved by changing the arrangement of the heat-exchanging tubes and the tube diameters thereof, and also by adjusting such conditions as the type of fluids passing through the heat-exchanging tubes as mentioned above, and the temperature, pressure, flow rate, type and the like of the fluid from one reaction chamber to another. As a result of these considerations, the arrangement of the heat-exchanging tubes is determined for each reaction chamber in such a way that the above-described optimum temperature distribution, for the reaction being conducted, is established therein. However, it is desirable to employ the same conditions and use a single type of fluid for the heat-exchanging tubes of each reaction chamber, and to provide separate collecting or distributing headers for each of the reaction chambers so as to collect or distribute the fluid and cause the fluid to flow out of or into the heat-exchanging tubes in each corresponding reaction chamber. When the reaction has a very steep curve as its optimum temperature distribution and the reaction is carried out in a plurality of reaction chambers by causing the reaction gas to flow in the same direction in at least two such chambers, it may be more convenient in some instances to provide a separate collecting or distributing header for each group of heat-exchanging tubes arranged on the same circle in both chambers so as to cause the fluid to flow out of or into the heat-exchanging tubes in a uniform manner as mentioned above.

Any heat-exchanging fluid can be employed in the heat-exchanging tubes of this invention so long as it does not corrode the reactor. However, it is necessary that the fluid shall flow through the heat-exchanging tubes in a quantity sufficient to remove the heat of an exothermic reaction or to supply heat required for an endothermic reaction. In this sense, it is most important to use a liquid which can be condensed or boiled at a desired temperature, either higher or lower by a selected temperature difference, from the reaction temperature, which temperature difference is required for effecting heat exchange by changing the pressure of the fluid. It is preferable to use liquids having a melting point of 12° C. or lower as the above heat-exchanging fluid. As exemplary liquids which are relatively inexpensive and capable of satisfying these conditions, there can be mentioned water, saturated aliphatic hydrocarbons having boiling points in the range of 100°–350° C., chlorinated aromatic hydrocarbons, a mixture of diphenyl and diphenyl oxide, alkylbenzenes, alkylnaphthalenes, and mixtures thereof.

In the present invention, many embodiments are contemplated with respect to the structure of the reactor. Additional embodiments of the structure of the reactor will hereinafter be described. In the reactor according to this invention, the outer shell 1 shown in FIGS. 1 and 2 can be a pressure-resistant outer shell. However, the pressure-resistant outer shell of a pressure-resistant reactor is heated to an elevated temperature during operation. When such a reactor is employed for the synthesis of, for example, ammonia from hydrogen gas and nitrogen gas, the pressure-resistant outer shell at an elevated temperature is brought into direct contact with hydrogen gas of a high partial pressure, thereby enhancing the danger of the development of the hydrogen-enbrittlement phenomenon in the steel of which the outer shell is made. In this case, it may be possible to avoid hydrogen-enbrittlement of the outer shell by: (1) installing the reactor shown in FIGS. 1 and 2 in a pressure-resistant enclosing vessel which is somewhat larger in both inner diameter and internal volume than the reactor; (2) causing a feed gas, which has not been fully preheated and which is at a relatively low tempeature, to pass through the space between the inner wall of the pressure-resistant vessel and the outer wall of the reactor; (3) preheating the feed gas, which has passed through the above space, to a desired temperature by means of the above-described heat-exchanger provided in the reactor; and then (4) causing the thus-preheated feed gas to flow into a first reaction chamber packed with a catalyst to initiate the reaction.

Figure 6:
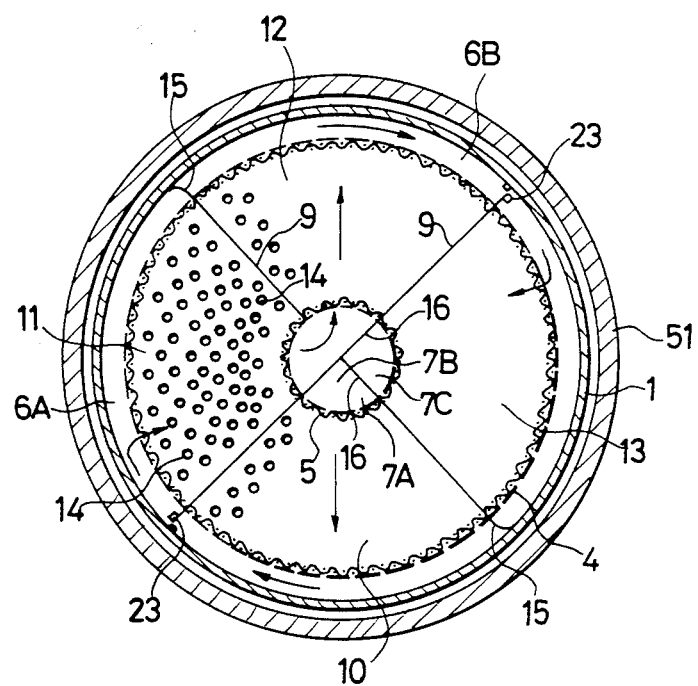
FIG. 6 is a horizontal cross-sectional view of the reactor taken on line VI—VI in FIG. 5.

FIGS. 5 and 6 illustrate a further embodiment of the reactor according to this invention. In FIG. 5, the right half shows principally the heat-exchanging tubes, distributing headers, collecting headers, and fluid-charging and fluid-discharging pipes. The structures of the partition walls and the outer shell are shown in the left half. In FIGS. 5 and 6, reference numeral 51 indicates a pressure-resistant vessel. Reference numeral 1 designates the outer shell of the reactor. In the illustrated embodiment, the bottom and top walls 2 and 3 respectively adjoining the outer shell 1 also comprise the top and bottom walls of the pressure-resistant vessel 51. A heat insulating material is packed into the whole anular space between the pressure resistant vessel 51 and the outer shell 1. Numeral 4 indicates an outer gas-permeable catalyst retainer, while a similar inner catalyst retainer is indicated by numeral 5. Each of the catalyst retainers 4,5 comprises a cylindrical wall having a plurality of through-holes therein and one or two sheets of wire mesh. Numerals 6 and 7 indicate, respectively, outer gas flow passages and inner gas flow passages.

The intercylinder space between the outer catalyst retainer 4 and inner catalyst retainer 5 is divided by four radially extending vertical partition walls 9 into a first reaction chamber 10, a second reaction chamber 11, a third reaction chamber 12 and a fourth reaction chamber 13. Two radially extending outer dividing walls 15 and three radially extending inner dividing walls 16 are provided to define, respectively, the outer gas flow passages 6A and 6B and the inner gas flow passages 7A,7B and 7C so that the gas supplied from the feed gas inlet 17 is caused to pass through the first, second, third and fourth reaction chambers 10,11,12 and 13 in series as shown by the arrows in FIG. 6, and is thereafter allowed to flow out of the reactor through a product gas outlet 18. Orifice-defining perforated plates 23 are provided in the outer gas flow passages 6A,6B at positions corresponding to radially outwardly extending extensions of the partition wall 9 separating and second reaction chambers 10,11 and the partition wall 9 separating the third and fourth reaction chambers 12,13, so as to cause the gas to flow uniformly in radial directions in each of the reaction chambers 10,11,12 and 13 because the perforated plates 23 impart a slight degree of resistance to the flow of the gas.

In order to facilitate inspection and repair of the interior of the reactor, the upper and lower parts of each of the partition walls separating the reaction chambers are provided respectively with removable portions 9A and 9B, which are constructed so that they can be attached at their respective lower and upper edges to upper and lower end portions 24,25 of the middle portion of each partition wall. Projections for attachment of the removable portions 9A, 9B are provided on the inner faces of the bottom and top walls 2,3 and the outer surfaces of upper and lower end portions of the tubular members defining the inner gas flow passages 7A,7B and 7C by means of bolts and nuts.

Furthermore, the outer edge portions of the radially extending outer walls 15 provided in the outer gas flow passages 6A and 6B are curved so as to take up thermal stress which may develop in the partition walls 9 due to the temperature difference between the outer shell 1 and the reaction chambers 10,11,12 and 13. For the same purpose, the orifice-defining perforated plates 23 fit into slots defined by projections provided at corresponding locations on the interior of outer shell 1 as shown in FIG. 6, since a slight degree of gas leakage is permitted at the locations in the gas flow passages of the orifice-defining perforated plates 23. A catalyst-charging pipe 21 also serves as a manhole for inspection and repair. A catalyst-discharging pipe 22 also serves as a manhole.

A plurality of heat-exchanging tubes 14 are arranged vertically in partially circular groups which are concentric with the common central axis of both of the catalyst retainers 4,5. The heat-exchanging tubes may have various shapes in horizontal cross section, such as circular, egg-shaped or elliptical. Tubes having an elliptical or egg-shaped horizontal cross section are preferred compared with tubes having a circular horizontal cross section because the former tubes increase the overall heat transfer coefficient therethrough. The upper ends and lower ends of these heat-exchanging tubes 14 respectively communicate with and are connected to corresponding collecting and distributing header structures 19. In the embodiment shown in FIGS. 5 and 6, independent collecting and distributing header structures 19 are provided for each reaction chamber. When fluid is caused to flow downwardly through the heat-exchanging tubes 14, the upper header structures 19 serve as distributing headers while the lower header structures 19 are used as collecting headers. These distributing headers and collecting header structures communicate with and are connected to inlet and outlet pipes 20, respectively, in accordance with the direction of flow of the fluid. When a fluid is caused to flow upwardly through the heat-exchanging tubes, the lower header structures 19 serve as distributing headers while the upper header structures 19 are used as collecting headers. Similarly, when the fluid passes downwardly, the upper pipe 20 serves as an inlet pipe whereas the lower pipe 20 is used as an outlet pipe. On the other hand, the lower pipe 20 serves as an inlet pipe and the upper pipe 20 serves as an outlet pipe when the fluid is caused to flow upwardly.

Each of the distributing header structures and collecting header structures 19 can be constructed according to either of two basically different structures, namely, a structure which is principally a tubular member or a structure which uses plate-like members. The distributing and collecting header structures 19 illustrated in FIGS. 5 and 6 are made of tubular members of circular cross section. In the illustrated embodiment, the collecting headers and distributing header structures 19, which are of substantially the same structure, are positioned symmetrically about the vertical center plane of the reactor. Thus, only collecting header structures 19 will be described in the following discussion, assuming an upward fluid flow in the tubes 14.

A primary collecting tube 19A is connected to a number of heat-exchanging tubes 14. The primary collecting tube 19A is curved along an arc of the circle on which the corresponding heat-exchanging tubes 14 are arranged in the corresponding reaction chamber. The primary collecting tube 19A is in practice disposed horizontally. Connector tubes 19B couple each primary collecting tube 19A to a secondary collecting tube 19C. It is necessary to employ at least one connector tube 19B for each primary collecting tube 19A. The secondary collecting tube 19C is horizontal and extends substantially in a radial direction and is connected to the fluid discharging pipe 20. The numbers and arrangement of the primary collecting tubes 19A, connector tube(s) 19B and secondary collecting tube(s) 19C can be suitably adjusted in accordance with the number and distribution of the heat-exchanging tubes arranged in the associated reaction chamber.

In the reactor is large in size or is adapted to carry out a reaction which gives off a great deal of reaction heat and a large number of heat-exchanging tubes are required for each reaction chamber, it may be desirable to provide tertiary collecting tubes, a quaternary collecting tube and connector pipes (not shown) coupling the tertiary and quaternary collecting tubes, the foregoing additional tubes being provided to allow communication between the secondary collecting tubes 19C and the corresponding fluid discharging pipe 20, whereby a large number of the heat-exchanging tubes in each reaction chamber can easily be connected to the fluid-charging and fluid-discharging pipe 20 which is provided for the corresponding reaction chamber by using additional collecting tubes and connector tubes as described above. When the number of heat-exchanging tubes is small, the secondary collecting tubes 19C and connector tubes 19B can be omitted, thereby allowing the fluid discharging pipe 20 to be divided into a plurality of branch pipes and coupling each primary collecting tube 19A to a corresponding branch pipe.

Figure 7:
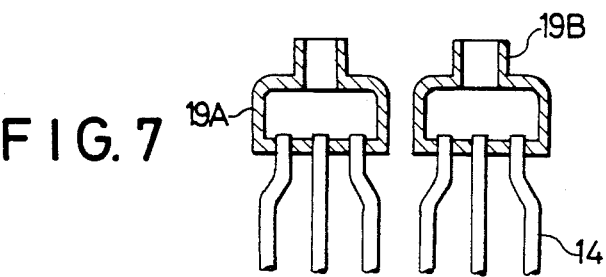
FIG. 7 is a vertical cross-sectional view of one embodiment of a primary collecting header according to the invention.

FIG. 7 shows an example of a primary collecting tube 19A which is a tubular member of substantially rectangular cross section. Depending on the arrangement of the heat-exchanging tubes 14, use of such a tubular member having a rectangular cross section as the primary collecting tube 19A may facilitate the connection between the primary collecting tube 19A and the associated heat-exchanging tubes 14. In this embodiment, tubular members having a circular cross section can be employed without difficulty or inconvenience as the connector tubes 19B, the secondary collecting tube 19C and any subsequent tubes connected above the connector tubes 19B.

When the reactor is used to carry out a reaction which generates a great deal of reaction heat and a large number of heat-exchanging tubes are required, it may be necessary to employ a large number of primary collecting tubes 19A and, in some instances, secondary collecting tubes 19C. In this case, the primary collecting tubes 19A or secondary collecting tubes 19C may be arranged alternately at different heights as shown in FIG. 1 so that the connections between the primary collecting tubes 19A and their corresponding heat-exchanging tubes 14, the connections between the primary collecting tubes 19A and their corresponding connector tubes 19B, or the connections between the connector tubes 19B and their corresponding secondary collecting tubes 19C can be facilitated.

Figure 8:
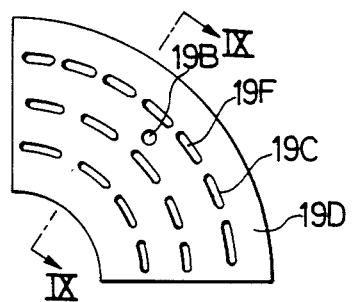
FIG. 8 is a top plan view of one embodiment of a plate-like collecting header according to the invention.
Figure 9:
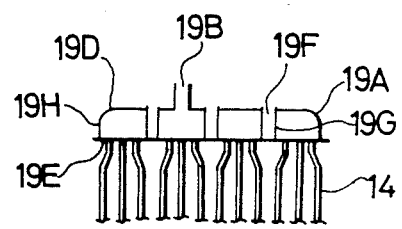
FIG. 9 is a vertical cross-sectional view of the plate-like collecting header taken on line IX—IX in FIG. 8.

FIGS. 8 and 9 illustrate an example of a collecting or distributing header which is basically made of plate-like members. The example of FIGS. 8 and 9 is a collecting header. The primary collecting header 19A is made from plate-like members and includes upper and lower plates 19D and 19E, respectively, which have the shape of a segment of an annulus. These plates 19D, 19E are securely joined together by means of a vertical wall 19H which is connected to the entire peripheral edge of each of the two plates 19D and 19E at the upper and lower edges of said wall 19H, respectively. A number of short tubes 19G connect the plates 19D and 19E at central portions thereof so that the resulting collecting header can withstand the pressure of a fluid present therein. A connector tube 19B, or alternatively, a fluid discharging pipe 20, is connected to the plate 19D, and a plurality of heat-exchanging tubes 14 are connected to the other plate 19E. A number of through-holes 19F extend through the two plates 19D, 19E and are provided by the short tubes 19G. The through-holes 19F have an elongated elliptical cross section and are used as openings for allowing catalyst grains to pass therethrough when the granular catalyst is packed or discharged. When a plate-like collecting header having no openings for charging a granular catalyst therethrough is used, it is very difficult to pack or discharge the catalyst and to impart sufficient strength to the collecting header. It is possible to use the above-described tubular secondary collecting tubes 19C, tubular connector tubes 19B, etc. in combination with such plate-like collecting headers 19A so as to facilitate the flow of a fluid for heat exchange.

Figure 10:
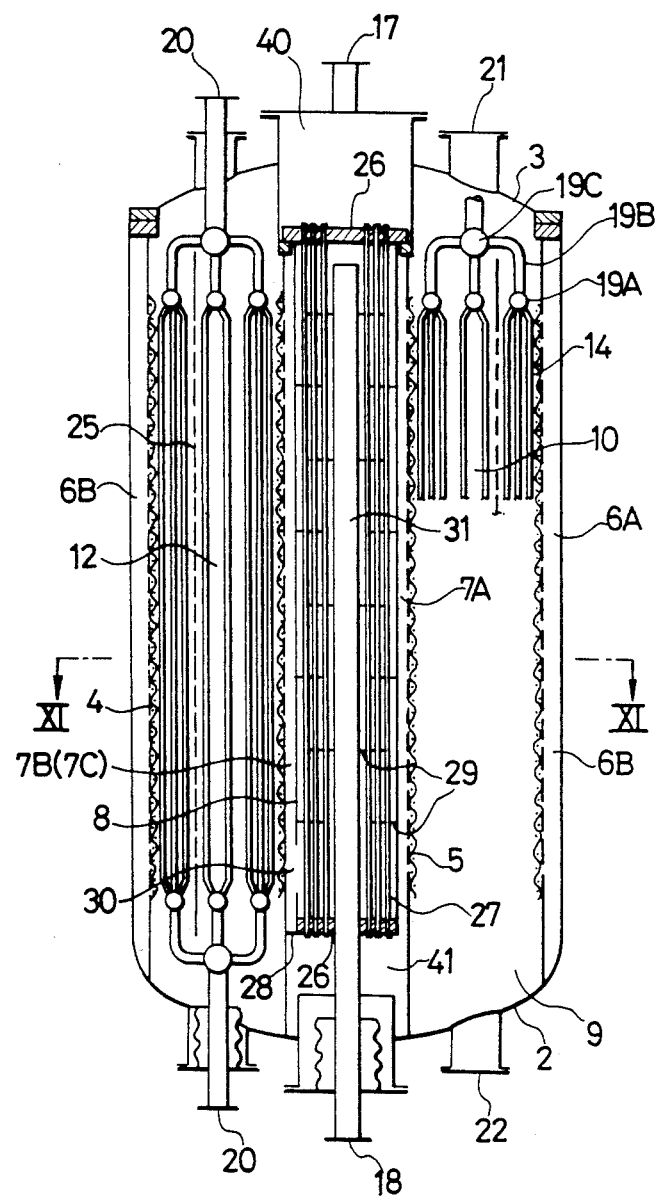
FIG. 10 is a vertical cross-sectional view of one embodiment of a reactor according to this invention which reactor has a heat exchanger for preheating a feed gas within its central part.
Figure 11:
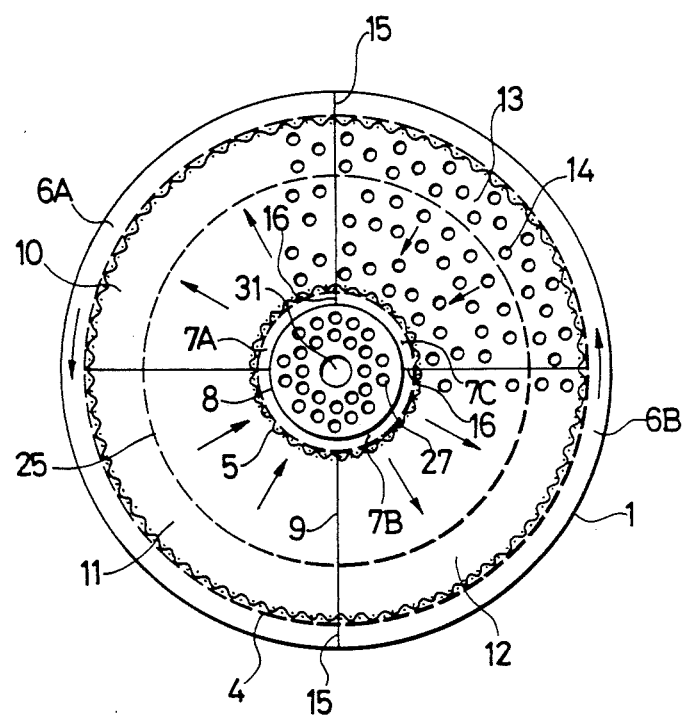
FIG. 11 is a horizontal cross-sectional view of the reactor taken on line XI—XI in FIG. 10.

In the reactor of this invention, it is possible to use a cylindrical member as the inner barrier wall (cylindrical member) 8 so that a heat-exchanger for preheating a feed gas of a low temperature with heat from the resulting reaction product gas of a high temperature can be provided within the cylindrical member in the central part of the reactor. FIGS. 10 and 11 illustrate a reactor according to a further embodiment of this invention, in which embodiment a shell-and-tube heat exchanger is provided within the inner circular barrier wall 8 of the reactor shown in FIG. 1 so as to preheat a feed gas, which is to be supplied to the reactor from the feed gas inlet 17 and is at a temperature not sufficiently high, with a reaction product gas which has flown out of the fourth reaction chamber 13 and is at a higher temperature. The reactor depicted in FIGS. 10 and 11 is different in the inside structure of the inner catalyst retainer from the reactor already discussed with reference to FIG. 1 but is substantially the same as the latter reactor in the remaining parts. Accordingly, a description will be made principally of the inside structure of the inner catalyst retainer which is different from its counterpart shown in FIG. 1.

The heat-exchanger incorporated in the embodiment shown in FIGS. 10 and 11 for preheating the feed gas is principally constructed of the inner circular barrier wall 8 which serves as the shell of the heat exchanger, a pair of upper and lower disk-shaped, tube-retaining grids 26 and a number of preheating tubes 27 attached at their both ends to the tube-retaining grids. The feed gas, which has been supplied from the gas inlet 17 and has still not been preheated to any sufficient extent, flows through a spacing 40 and into the number of preheating tubes 27. While travelling through the preheating tubes 27 downwardly, the feed gas is preheated by the reaction product gas which flows outside these tubes 27 and is at an elevated temperature. The feed gas, which has passed through the preheating tubes 27, is then caused to flow out into a spacing 41, which is divided from the inner gas flow passages 7B,7C by means of a barrier plate 28. Due to the provision of the barrier plate 28, the feed gas is allowed to flow upwardly into the inner gas flow passage 7A and then to flow from the inner gas flow passage 7A into the first reaction chamber 10. The gas, which has flowed out of the first reaction chamber 10, passes, substantially in the same way as in FIG. 1, through the outer gas flow passage 6A, second reaction chamber 11, inner gas flow passage 7B, third reaction chamber 12, outer gas flow passage 6B and third reaction chamber 13 in order and in series as indicated by arrows and then flows out as the high-temperature reaction product gas into the inner gas flow passage 7C. An opening 30 is formed through a lower part of the inner circular barrier wall 8 which is in contact with the inner gas flow passage 7C. Therefore, the high-temperature reaction gas flowed out into the inner gas flow passage 7C is allowed to flow into a lower part of the shell side of the heat exchanger through the opening 30. The reaction product gas, which has flowed into the lower part of the shell side of the heat exchanger, is caused to flow upwardly as a whole while alternately changing its flowing direction, namely, flowing from the outer side to the central part, from the central part to the outer side and so on through a flow passage established by baffle plates 29 in the shell side of the heat exchanger and undergoing a heat exchange with the feed gas flowing through the preheating tubes 27. The resultant reaction product gas, which has reached the uppermost part in the shell side of the heat exchanger and has been lowered in temperature, passes through a central tube 31 and flows out of the reactor through the reaction product gas outlet 18.

As described previously, a heat-exchanger for preheating the feed gas with heat from the resulting reaction product gas of a high temperature, which product gas has left the final reaction chamber, can be provided in at least one of the chambers separated by vertical partition walls 9 from the reaction chambers and which is sectorial in horizontal cross section. Here, primarily because of the configurations of the chamber, it is preferable to employ a heat-exchanger which principally uses plate-like members as its heat-transfer surfaces, that is, a plate-like heat-exchanger rather than the shell-and-tube heat-exchanger provided in the central part of the reactor described in Japanese Patent Laid-Open No. 149640/1980.

Figure 12:
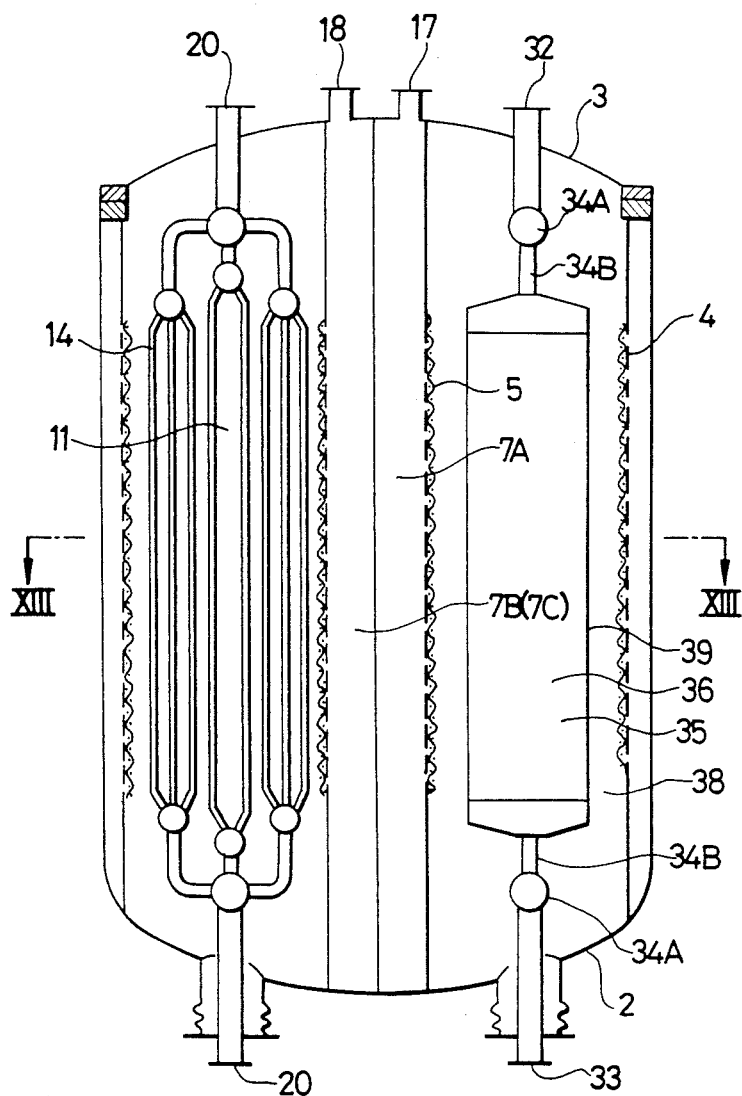
FIG. 12 is a vertical cross-sectional view of another embodiment of a reactor according to this invention which reactor has a heat exchanger for preheating a feed gas within a chamber having a sectional horizontal cross section.
Figure 13:
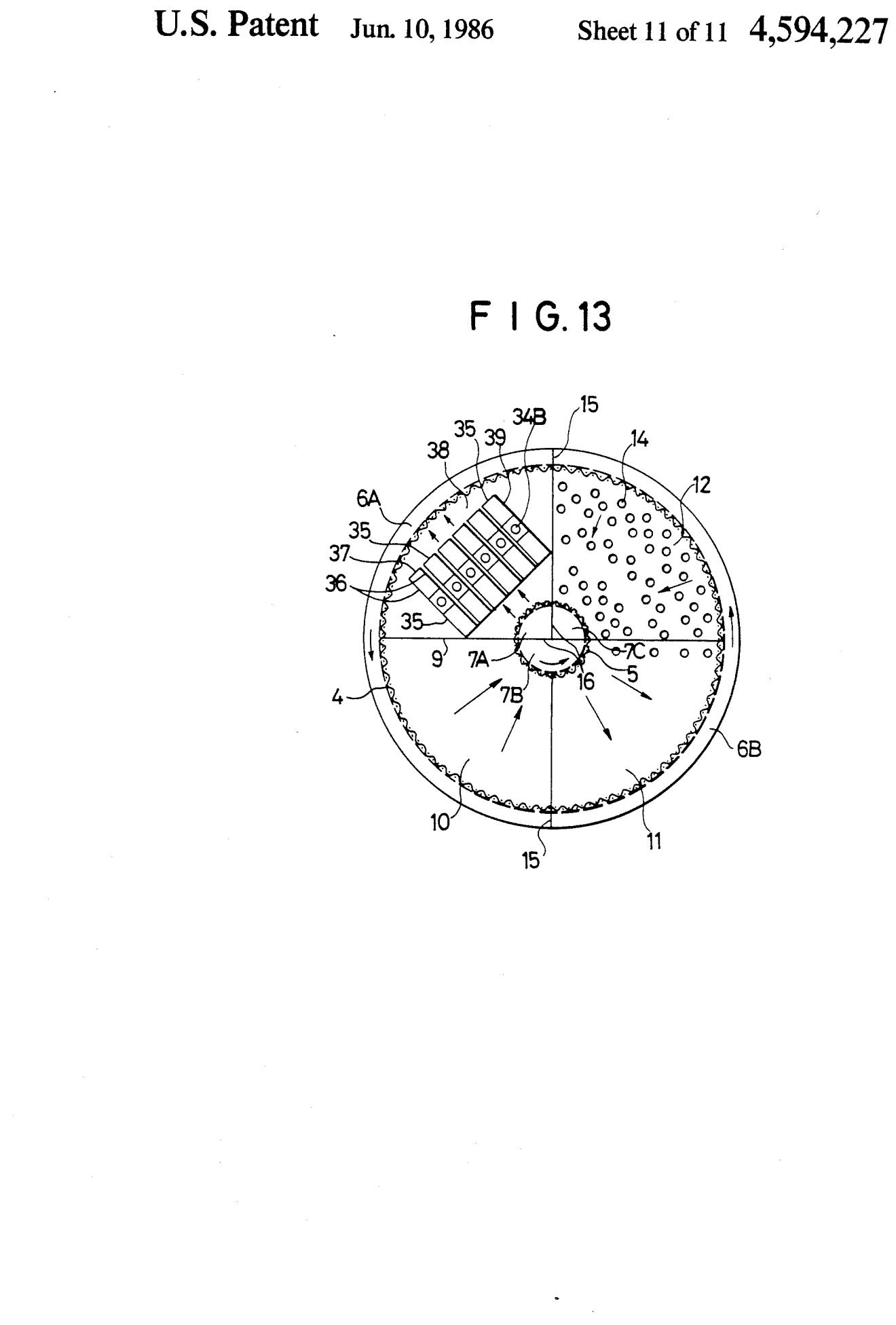

FIGS. 12 and 13 illustrate one example of the reactor described above. In the reactor depicted in FIGS. 12 and 13, one of the chambers divided by the vertical partition walls 9 is used as a preheating chamber 38 for installation of a plate-like heat exchanger 39 so as to preheat the feed gas, whose temperature has not yet been raised to any sufficient extent, with a high-temperature gas and the first reaction chamber 10 is not provided with any heat exchanging tubes. The following description will be limited only to parts which are different from those already described above with reference to the reactor of FIG. 1. It should be borne in mind that most of heat-exchanging tubes 14 are omitted for simplicity in FIG. 13 although a number of heat-exchanging tubes 14 are arranged in the second reaction chamber 11. The plate-like heat exchanger 39 provided within the preheating chamber 38 is a heat exchanger formed of a number of flattened-rectangular heat-exchanging boxes 35 which are each made of two heat transfer sheets 36 positioned in a face-to-face relation and with a relatively small and desired distance therebetween and joined together by means of connector sheets 37. Each two adjacent heat-exchanging boxes 35 are disposed with a desired interval.

The feed gas, which has been supplied through the feed gas inlet 17, flows through the inner gas flow passage 7A and into the preheating chamber 38, where the feed gas is caused to flow from the central side of the reactor toward the outside, through spacings established between adjacent heat-exchanging boxes 35 and is heated by a high-temperature gas flowing through the heat-exchanging boxes 35. The thus-preheated feed gas passes through the outer gas flow passage 6A and then flows into the first reaction chamber 10 as indicated by arrows. The first reaction chamber 10 is not provided with any heat-exchanging tubes and the reaction thus proceeds adiabatically there. The gas, which has flowed out of the first reaction chamber, is then allowed to pass through the inner gas flow passage 7B, second reaction chamber 11, outer gas flow passage 6B and third reaction chamber 12 in order and in series, thereby completing the reaction. The resultant gas thereafter flows out into the inner gas flow passage 7C and then flows out of the reactor through the reaction product gas outlet 18 provided at the top of the inner gas flow passage 7C. The high-temperature heating gas, which is caused to flow through the heat-exchanging boxes 35, is caused to flow in through heating gas inlet 32 and distributed at a tubular heating gas header 34A into a number of heating gas connector tubes 34B which are provided in communication with upper inner parts of their corresponding heat-exchanging boxes 35. Thereafter, the heating gas flows downwardly through the heat-exchanging boxes 35. In the course of this downward flow, the heating gas undergoes a heat exchange with the feed gas and becomes cooler as described above. The thus-cooled heating gas flows out of the heat-exchanging boxes 35 at lower extremities thereof and then passes through connector tubes 34B provided for withdrawal of the heating gas. The thus flowed-out portions of the heating gas are cuased to merge at a tubular heating gas lower header 34A and flows out of the reactor through a heating gas outlet 33. As the above-described heating gas, it is feasible to introduce a gas having a suitable temperature and pressure from the outside of the reactor. Use of such heat-exchanging boxes may not bring about advantages due to their inherent structures if there is a significant difference in pressure between the insides of the heat-exchanging boxes and their outside. Accordingly, it is desirable to pass, through the heat-exchanging boxes, a heating gas whose pressure is not so different from that of the feed gas. For the same reasons and for recovering heat from the reaction product gas flowed out through the reaction product gas outlet 18, it is desirable to guide the reaction product gas which has flowed out through the reaction product gas outlet 18 into the heating gas inlet 32 through a tube (not shown) provided outside the reactor or to connect the heating gas inlet 32 to an upper part of the inner gas flow passage 7C within the reactor so as to draw out the reaction product gas through the heating gas outlet 33. Needless to say, it is possible to preheat a feed gas by the heat of a reaction product gas by providing such a shell-and-tube heat exchanger as shown in FIGS. 10 and 11 or such a plate-like heat exchanger as despicted in FIGS. 12 and 13 at a location outside the reactor, although this manner of arrangement of a heat exchanger is not illustrated in the drawings.

In the reactor according to this invention, the arrangement of the heat-exchanging tubes in each reaction chamber is of great importance. Since the heat-exchanging tubes are provided to achieve the above-described optimum temperature distribution, the arrangement thereof generally varies from one reaction chamber to another. It is very unusual even within the same reaction chamber to have the heat-exchanging tubes be equally spaced from each other in the direction of flow of the gas stream, that is, in the radial direction. More commonly, these heat-exchanging tubes are arranged with different spacings in radial directions. In other words, it is more typical, even within the same reaction chamber, that the distance between the outer catalyst retainer 4 and the outermost concentric partial circle on which some heat-exchanging tubes 14 are arranged, the distance between each two adjacent concentric partial circles on which heat-exchanging tubes are arranged, and the distance between the innermost concentric partial circle on which heat-exchanging tubes are arranged and the inner catalyst retainer 5 are all different from one another, and these distances in one reaction chamber can vary from those in another reaction chamber. Generally speaking, these distances preferably vary within the range of from 50 mm to 500 mm. On the other hand, it is preferable to establish a uniform circumferential distance, in the range of 20 to 200 mm, between the central axis of each heat-exchanging tube and the central axes of adjacent heat-exchanging tubes on the same concentric partial circle. This distance can vary from one partial circle to another in each of the reaction chambers and from one reaction chamber to another, even if the relevant heat-exchanging tubes are arranged on the same concentric circle in the reactor. The preferable outer diameter of the heat-exchanging tubes is from 10 mm to 100 mm. If the diameter of the heat-exchanging tubes is too large, it is very difficult to provide a sufficient heat-transfer area in the reactor. On the other hand, if heat-exchanging tubes having an excessively small diameter are used, excessive time is required to construct the reactor. The diameters of the heat-exchanging tubes can vary from one reaction chamber to another and/or from one concentric partial circle to another.

In order to ensure the uniformity of the gas stream flowing in radial directions in each of the reaction chambers of the reactor according to this invention, it is preferred to provide one or more vertical, cylindrical, perforated plate(s), if necessary, which plate(s) is(are) coaxial with and is located between the outer and inner catalyst retainers 4,5 in each reaction chamber. A perforated plate described hereinabove is installed as numeral 25, for example, in the reactor shown in FIGS. 10 and 11. In addition, the orifice-defining perforated plates 23 are provided, for the same purpose, as described above.

Prior to use of the reactor according to this invention, it is necessary to pack the space within each reaction chamber at least between the upper end face of the lowermost header 19A and the lower end face of the uppermost header 19A with the catalyst to be used. The foregoing faces of the lowermost and uppermost headers are the ones on different sides of and nearest to a horizontal plane passing through the vertical midpoint of the reaction chamber. The remaining space within the chamber may be packed with an inexpensive, granular, non-catalyst material. It is desirable to make the upper and lower end portions of the outer and inner catalyst retainers, which upper and lower end portions correspond, respectively, to the space packed with the granular material described above, impervious to gases, regardless of whether the upper and lower portions of the chamber are packed with a catalyst or a granular material other than a catalyst.

As materials for constructing the reactor according to this invention, it is necessary to use materials which can satisfactorily withstand the temperatures and pressures of the reactions to be carried out therein and the corroding action of the feed gas and resulting reaction product gas. Exemplary materials capable of satisfying these requirements include carbon steels, low-alloy steels containing nickel, chromium, manganese, molybdenum and like elements in small proportions, and stainless steels containing one or more of the above non-ferrous elements in larger proportions. Further, it is feasible to use these different types of steel in combination to make a single reactor unit, choosing the type of steel to be used for each part in accordance with the varying requirements of various different parts of the reactor.

The present invention can be applied to a number of reactions in which both raw material(s) and reaction products(s) are gaseous at the temperature and pressure of the reaction and no liquid or solid material is formed in the course of the reaction. As representative examples of these reactions, there can be mentioned the following exothermic reactions:

(1) Preparation of ammonia from hydrogen gas and nitrogen gas, particularly, at a gauge pressure of 150 kg/cm$^2$ or less;

(2) Preparation of methanol from hydrogen gas and carbon monoxide gas and/or carbon dioxide gas, particularly, at a gauge pressure of 150 kg/cm$^2$ or less;

(3) Preparation of aliphatic higher monohydric alcohols, such as ethanol, propanol and butanol, from hydrogen gas and carbon monoxide gas and/or carbon dioxide gas;

(4) Preparation of methane and higher hydrocarbons from hydrogen gas and carbon monoxide gas and/or carbon dioxide gas;

(5) Preparation of hydrogen gas and carbon dioxide gas from carbon monoxide gas and steam;

(6) Preparation of chlorinated hydrocarbons from the corresponding hydrocarbons and chlorine gas;

(7) Preparation of ethylene oxide, maleic anhydride, phthalic anhydride and the like from the corresponding hydrocarbons and oxygen;

(8) Preparation of vinyl chloride from a hydrocarbon, chlorine gas and/or hydrogen chloride gas, and oxygen;

(9) Preparation of hydrocyanic acid and acrylonitrile from a hydrocarbon, ammonia and oxygen;

(10) Preparation of saturated hydrocarbons from the corresponding unsaturated hydrocarbons and hydrogen gas;

(11) Preparation of saturated hydrocarbons by the alkylation of unsaturated hydrocarbons and saturated hydrocarbons;

(12) Preparation of formaldehyde from methanol and oxygen gas; and

(13) Preparation of saturated and unsaturated aliphatic hydrocarbons and aromatic hydrocarbons from methanol.

As exemplary endothermic reactions, there may be mentioned:

(14) Preparation of hydrogen gas and carbon monoxide gas and/or carbon dioxide gas from saturated aliphatic hydrocarbons and steam; and

(15) Preparation of hydrogen gas and carbon monoxide gas from methanol.

The foregoing reactions are carried out using substantially the same reaction conditions and catalysts which are known in the art.

Having now fully described the invention, it will be apparent to one of ordinary skill in the art that many changes and modifications can be made thereto without departing from the spirit or scope of the invention as set forth herein.

The embodiments of the invention in which an exclusive property or privilege is claimed are defined as follows:

1. In a reactor having a cylindrical, upright outer shell having a top wall and a bottom wall, in which a catalytic reaction can be effected, in the presence of a granular catalyst, under conditions effective to maintain both the reactants and the product in a gaseous state at the temperatures and pressures of the reaction, the improvement which comprises:

(a) a gas-permeable, cylindrical, outer catalyst retaining wall positioned within said outer shell and spaced from the inner wall of said outer shell, thereby defining an outer, first, annular, intercylinder space between the inner surface of said outer shell, the outer surface of said catalyst retaining wall and said top and bottom walls;

(b) a gas-permeable, cylindrical, inner catalyst retaining wall positional coaxial with, iinside of and spaced from said outer catalyst retaining wall, thereby defining a second, annular, intercylinder space between said outer catalyst retaining wall, said inner catalyst retaining wall and said top and bottom walls, said inner catalyst retaining wall further defining an internal zone therewithin;

(c) at least two vertical partition walls extending in respectively different radial directions between said outer catalyst retaining wall and said inner catalyst retaining wall so as to divide said second intercylinder space into a plurality of separate chambers which have the shapes of segments of an annulus in horizontal cross section, at least two of which chambers define at least two separate reaction chambers when said granular catalyst is packed therein;

(d) a first heat exchange means comprising a plurality of heat exchange tubes which extend vertically through at least one of said reaction chambers, said tubes being arranged in partially cylindrical groups wherein said groups are concentric with the common axis of both of said outer and inner catalyst retaining walls, with the tubes in each of said groups being spaced substantially the same radial distance from said common axis and being circumferentially spaced from each other, the respective groups of tubes being spaced different radial distances from said common axis;

(e) at least one collecting header and at least one distributing header provided respectively at opposite vertical ends of each of said reaction chambers having said heat exchange tubes therein, said headers being connected to the opposite ends of said heat exchange tubes extending through the corresponding reaction chamber in order to collect or distribute, respectively, heat exchange fluid which passes through said heat exchange tubes;

(f) at least one fluid outlet and at least one fluid inlet which communicate with said collecting header and said distributing header respectively;

(g) at least one catalyst charging inlet and at least one catalyst discharging outlet provided to each of said reaction chambers;

(h) one or more radially extending, vertical, dividing walls provided in at least one of (i) said first intercylinder space and (ii) said internal zone within said inner catalyst retaining wall, said dividing walls being located so as to define the flow path of a reaction gas stream so that said stream is caused to flow in series through at least two of said reaction chambers in radial directions alternately radially inwardly and outwardly and said stream is caused to flow circumferentially through a circumferential flow path in at least one of (i) said first intercylinder space and (ii) said internal zone within said inner catalyst retaining wall as its flows from a first one of said reaction chambers to the next, the direction of the flow in the first chamber being radially outwardly when said stream is introduced at the radially inward end of said chamber, and the flow direction in said first chamber being radially inwardly when said stream is introduced at the radially outward end thereof;

(i) at least one vertical, radially extending, perforated plate in the circumferential flow path between said one of said reaction chambers and the next reaction chamber, which perforated plate causes said stream to flow in the circumferential directions through the orifices defined by the perforations thereof, said perforated plate constituting a radial extension of one of said vertical partition walls; and (j) at least one reaction gas inlet and at least one product gas outlet provided in communication with said chambers.

2. A reactor as claimed in claim 1, further comprising a second, outermost, pressure-resistant vessel containing said outer shell, said vessel being spaced outwardly from said outer shell to define therebetween a flow path for relatively cool gas.

3. A reactor as claimed in claim 1, wherein radial distance between said outer catalyst retaining wall and the outermost concentric partial cylinder in which said heat exchange tubes are arranged, the distances between adjacent concentric partial cylinder in which said heat exchange tubes are arranged, and the distance between the innermost concentric partial cylinder in which said heat exchanging tubes are arranged and said inner catalyst retaining wall within the range of from 50 to 500 mm.

4. A reactor as claimed in claim 1, wherein the distance between the central axes of adjacent heat exchange tubes on the same concentric partial cylinder in the same reaction chamber is a uniform distance having a desired value in the range of from 20 to 200 mm.

5. A reactor as claimed in claim 1, wherein the outer diameter of each of said heat exchange tubes is within the range of 10 to 100 mm.

6. A reactor as claimed in claim 1, further comprising at least one perforated cylindrical plate coaxial with both of said catalyst retaining wall and positioned in said second intercylinder space, which perforated cylindrical plate is adapted to distribute a gas stream flowing through said chambers uniformly in all radial directions within each of said chambers.

7. A reactor as claimed in claim 1, wherein a catalytically inactive granular material is packed in the space above the lower end of the lowermost header in the upper portion of each reaction chamber containing said tubes and in the spaces below the upper end of the uppermost header in the lower portion of each reaction chamber containing said tubes, and the remaining space within each reaction chamber containing said tubes is packed with said granular catalyst.

8. A reactor as claimed in claim 1 in which said dividing walls (h) comprise second vertical dividing wall means disposed in said first intercylinder space and dividing said first intercylinder space into at least two separate sections which are isolated from each other so that said stream cannot flow directly between said separate sections of said first intercylinder space, said separate sections of said first intercylinder space being in communication with different ones of said chambers, and said internal zone within said inner catalyst retaining wall providing an uninterrupted, circumferentially extending passageway connecting the radially inner sides of chambers that are in communication with said separate sections of said first intercylinder space so that said stream can flow between said chambers.

9. A reactor as claimed in claim 1 in which each of said outer catalyst retaining wall and said inner catalyst retaining wall comprises a gas permeable portion which is substantially coextensive in vertical height and position with said heat exchange tubes, said inner and outer catalyst retaining walls each further comprising upper and lower imperforate portions which extend from the upper and lower ends of the gas-permeable portions to the top wall and bottom wall of the shell, respectively.

10. A reactor as claimed in claim 1 in which said inner and outer catalyst retaining wall are substantially coextensive in vertical height and position with said heat exchange tubes and said partition walls, and including upper and lower partition wall portions constituting vertical extensions of said partition walls, said partition wall portions extending from the upper and lower ends of said partition walls to the top wall and bottom wall of the shell, respectively.

11. A reactor as claimed in claim 1, wherein said reactor further comprises a vertical, cylindrical inner barrier wall positioned in said internal zone within said inner catalyst retaining wall and spaced radially therefrom and dividing said internal zone into two separate inner chambers.

12. A reactor as claimed in claim 11, further comprising heat exchanger means provided in one of said inner chambers, said one inner chamber being located within said barrier wall, which heat exchanger means preheats said reactants with heat from the reaction product gas which is at a higher temperature than said reactants.

13. A reactor as claimed in claim 1, in which another one of said separate chambers is free of catalyst and said heat exchange tubes and further wherein a second, heat exchange means is provided in said another chamber, wherein said second heat exchange means preheats said gaseous reactants with heat from the reaction product gas which is at a higher temperature than said gaseous reactants.

14. A reactor as claimed in claim 13, wherein said second heat exchange means is a platelike heat exchanger.

15. A reactor as claimed in claim 1, wherein said collecting and distributing headers each comprise a group of individual tubular members.

16. A reactor as claimed in claim 15, wherein each of the individual tubular members within said groups are arranged alternately at different vertical heights within said reaction chamber.

17. A reactor as claimed in claim 1, wherein at least one of said collecting and distributing headers comprises two vertically spaced-apart plates which face each other and are connected to form an enclosed header structure.

18. A reactor as claimed in claim 17, wherein said enclosed header structure has a plurality of vertical tube-shaped openings which pass therethrough so that said catalyst can pass through said openings.

19. A reactor as claimed in claim 1 in which said dividing walls (h) comprise first vertical dividing wall means disposed in said internal zone within said inner catalyst retaining wall and dividing said internal zone into at least two separate sections which are isolated from each other so that said stream cannot flow directly between said sections of said internal zone, said separate sections of said internal zone being in communication with different ones of said chambers, and said first intercylinder space provides a circumferentially extending passageway connecting the radially outer sides of the chambers that are in communication with said separate sections of said internal zone so that said stream can flow between said chambers, said perforated plate being disposed in said circumferentially extending passageway.

20. A reactor as claimed in claim 19 in which said dividing walls (h) also comprise second vertical dividing wall means disposed within said first intercylinder space and dividing said first intercylinder space into at least two separate sections which are isolated from each other so that said stream cannot flow directly between said separate sections of said first intercylinder space, said separate sections of said first intercylinder space being in communication with different ones of said chambers, and said internal zone within said inner catalyst retaining wall providing an uninterrupted, circumferentially extending passageway connecting the radially inner sides of chambers that are in communication with said separate sections of said first intercylinder space so that said stream can flow between said chambers.

21. A reactor in which a catalytic reaction can be effected, in the presence of a granular catalyst, under conditions effective to maintain both the reactants and the reaction product in a gaseous state during the reaction, comprising:
an upright enclosure, said enclosure comprising a vertically extending outer shell, a top wall and a bottom wall;

a gas-permeable outer catalyst retaining wall positioned within said enclosure, which retaining wall is spaced from the inner wall of said outer shell, thereby defining a first outer space between the inner surface of said outer shell, the outer surface of said outer catalyst retaining wall and said top and bottom walls;

a gas-permeable inner catalyst retaining wall positioned inside of said outer catalyst retaining wall, thereby defining a second space between said outer catalyst retaining wall and said inner catalyst retaining wall, said inner catalyst retaining wall further defining an internal central zone therewithin;

at least two vertical partition walls which divide said second space into a plurality of separate chambers, a plurality of said chambers having said granular catalyst packed therein and hereby defining corresponding reaction chambers;

a plurality of heat exchange tubes which extend into at least two of said reaction chambers;

at least one collecting header and at least one distributing header provided to each reaction chamber having said tubes therein and connected to opposite ends of said tubes extending into the corresponding reaction chamber in order to collect and distribute, respectively, a fluid for heat exchange which passes through said tubes;

at least one fluid outlet and at least one fluid inlet which communicate with said collecting header and said distributing header, respectively;

at least one catalyst charging inlet and at least one catalyst discharging outlet provided to each of said reaction chambers;

one or more first vertical dividing walls disposed in said internal zone within said inner catalyst retaining wall and dividing said internal zone into at least two separate sections which are isolated from each other so that said stream cannot flow directly between said sections of said internal zone, said first dividing walls constituting inward extensions of at least some of said partition walls, a first one of said second sections of said internal zone communicating with first and second ones of said chambers and a second one of said sections communicating with a third one of said chambers, said first one of said sections of said internal zone providing an uninterrupted circumferentially extending passageway connecting the radially inner sides of said first and second chambers so that said stream can flow between said first and second chambers;

one or more second vertical dividing walls disposed in said first outer space and dividing same into at least two separate sections which are isolated from each other so that said stream cannot flow directly between said sections of said first outer zone, said second dividing walls constituting outward extensions of at least some of said partition walls, a first one of said sections of said first outer space communicating with said second and third chambers and a second one of said sections of said first outer space communicating with said first chamber; said first one of said sections of said first outer space providing a circumferentially extending passageway connecting the outer sides of said second and third chambers so that said stream can flow between said second and third chambers;

a vertical radially extending perforated plate in said first outer space between said second and third chambers which perforated plate causes said stream to flow in the circumferential direction through the orifices defined by the perforations thereof, said perforated plate constituting a radial extension of one of said vertical partition walls; and at least one reactant gas inlet and at least one product gas outlet provided in direct communication with the first and last reaction chambers respectively through which said stream passes.

* * * * *

UNITED STATES PATENT AND TRADEMARK OFFICE
CERTIFICATE OF CORRECTION

PATENT NO. : 4,594,227
DATED : June 10, 1986
INVENTOR(S) : Kozo OHSAKI et al

It is certified that error appears in the above-identified patent and that said Letters Patent is hereby corrected as shown below:

Column 26, line 45; change "directions" to ---direction---.

Column 27, line 9; change "wall" to ---walls---.

line 49; change "wall" to ---walls---.

Column 30, line 3; delete "second".

Signed and Sealed this

Second Day of December, 1986

Attest:

DONALD J. QUIGG

Attesting Officer

Commissioner of Patents and Trademarks